United States Patent
Alabort Martinez

(10) Patent No.: US 11,946,118 B2
(45) Date of Patent: Apr. 2, 2024

(54) BETA TITANIUM ALLOY FOR ADDITIVE MANUFACTURING

(71) Applicant: ALLOYED LIMITED, Kidlington (GB)

(72) Inventor: Enrique Alabort Martinez, Kidlington (GB)

(73) Assignee: ALLOYED LIMITED, Kidlington (GB)

( * ) Notice: Subject to any disclaimer, the term of this patent is extended or adjusted under 35 U.S.C. 154(b) by 256 days.

(21) Appl. No.: 17/250,902

(22) PCT Filed: Sep. 24, 2019

(86) PCT No.: PCT/GB2019/052688
§ 371 (c)(1),
(2) Date: Mar. 23, 2021

(87) PCT Pub. No.: WO2020/065296
PCT Pub. Date: Apr. 2, 2020

(65) Prior Publication Data
US 2022/0025488 A1     Jan. 27, 2022

(30) Foreign Application Priority Data

Sep. 24, 2018 (GB) .................................. 1815532

(51) Int. Cl.
*C22C 14/00*      (2006.01)
*B33Y 70/00*      (2020.01)

(52) U.S. Cl.
CPC .............. *C22C 14/00* (2013.01); *B33Y 70/00* (2014.12)

(58) Field of Classification Search
CPC ......... B33Y 70/00; C22C 14/00; C22F 1/183; Y02P 10/25

(Continued)

(56) References Cited

U.S. PATENT DOCUMENTS

2009/0314823 A1   12/2009   Bray
2017/0306449 A1   10/2017   Lin et al.

FOREIGN PATENT DOCUMENTS

CN       1329177      1/2002
CN    101955035      1/2011
(Continued)

OTHER PUBLICATIONS

NPL: on-line translation of CN 103242235 A, Aug. 2013 (Year: 2013).*

(Continued)

*Primary Examiner* — Jie Yang
(74) *Attorney, Agent, or Firm* — NORTON ROSE FULBRIGHT US LLP

(57) ABSTRACT

A titanium-based alloy composition consisting in weight percent, of: 3.0 to 7.0% aluminium, 3.0 to 10.0% vanadium, 3.0 to 10.0% molybdenum, 2.0 to 7.0% tin, 0.0 to 6.0% zirconium, 0.0 to 5.0% niobium, 0.0 to 0.5% iron, 0.0 to 4.0% chromium, 0.0 to 2.0 tungsten, 0.0 to 0.5 % nickel, 0.0 to 0.5% tantalum, or between 0.0 to 2. tantalum when the sum of niobium and tantalum is 5.0% or less, 0.0 to 0.5% cobalt, 0.0 to 0.75% silicon, 0.0 to 0.5% boron, 0.0 to 0.5% carbon, 0.0 to 0.5% oxygen, 0.0 to 0.5% hydrogen, 0.0 to 0.5% nitrogen, 0.0 to 0.5% palladium, 0.0 to 0.5% lanthanum, 0.0 to 0.5% manganese or 0.0 to 2.5% manganese when the sum of chromium and manganese is 4.0 wt. % or less, 0.0 to 1.0% hafnium, the balance being titanium and incidental impurities which satisfies the following relationship: 0.027V+0.178Fe+0.055(Mo+0.5W)+0.016Zr+0.044Cr+0.033(Nb+Ta)+0.053Sn>1.0 where Mo, W, V, Zr, Sn, Cr, Fe, Ta and Nb represent amounts of molybdenum, tungsten, vanadium, zirconium, tin, chromium, iron, tantalum and niobium in wt. % respectively.

20 Claims, 28 Drawing Sheets

(58) Field of Classification Search
USPC .......................................................... 420/419
See application file for complete search history.

(56) References Cited

FOREIGN PATENT DOCUMENTS

| | | | |
|---|---|---|---|
| CN | 103243235 | | 8/2013 |
| CN | 103243235 A | * | 8/2013 |
| CN | 106435264 | | 2/2017 |
| WO | 2018/157071 | | 8/2018 |

OTHER PUBLICATIONS

Neelakantana, "Prediction of the martensite start temperature for β titanium alloys as a function of composition", *Scripta Materialia*, vol. 60, issue 8, p. 611, 2009.
Quested, et al. "Thermodynamic Modeling of Growth-Restriction Effects in Aluminum Alloys", *Acta Materialia*, vol. 53, issue 5, p. 1323, 2005.
Sadeghpor et al., "A new multi-element beta titanium alloy with a high yield strength exhibiting transformation and twinning induced plasticity effects", *Scripta Materialia*, vol. 145, pp. 104-108, 2018.
International Search Report and Written Opinion for International Patent Application No. PCT/GB2019/052688 dated Nov. 22, 2019.
United Kingdom Search Report for United Kingdom Patent Application No. GB1815532.5 dated Mar. 11, 2019.

* cited by examiner

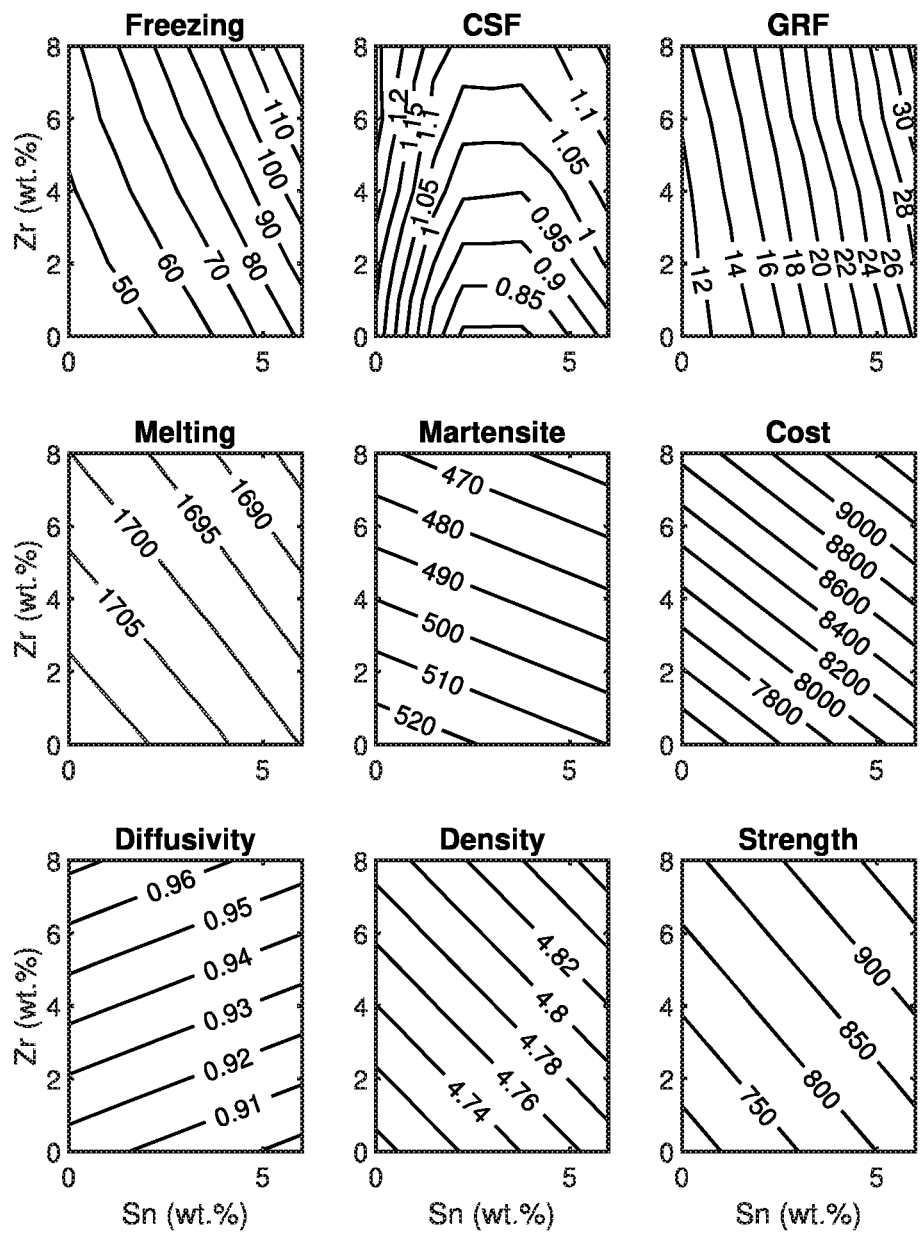
Figure 1: Contour maps of the merit indeces for the Ti-5Al-5V-5Mo-YZr-XSn-0Fe-0Cr-0Nb system.

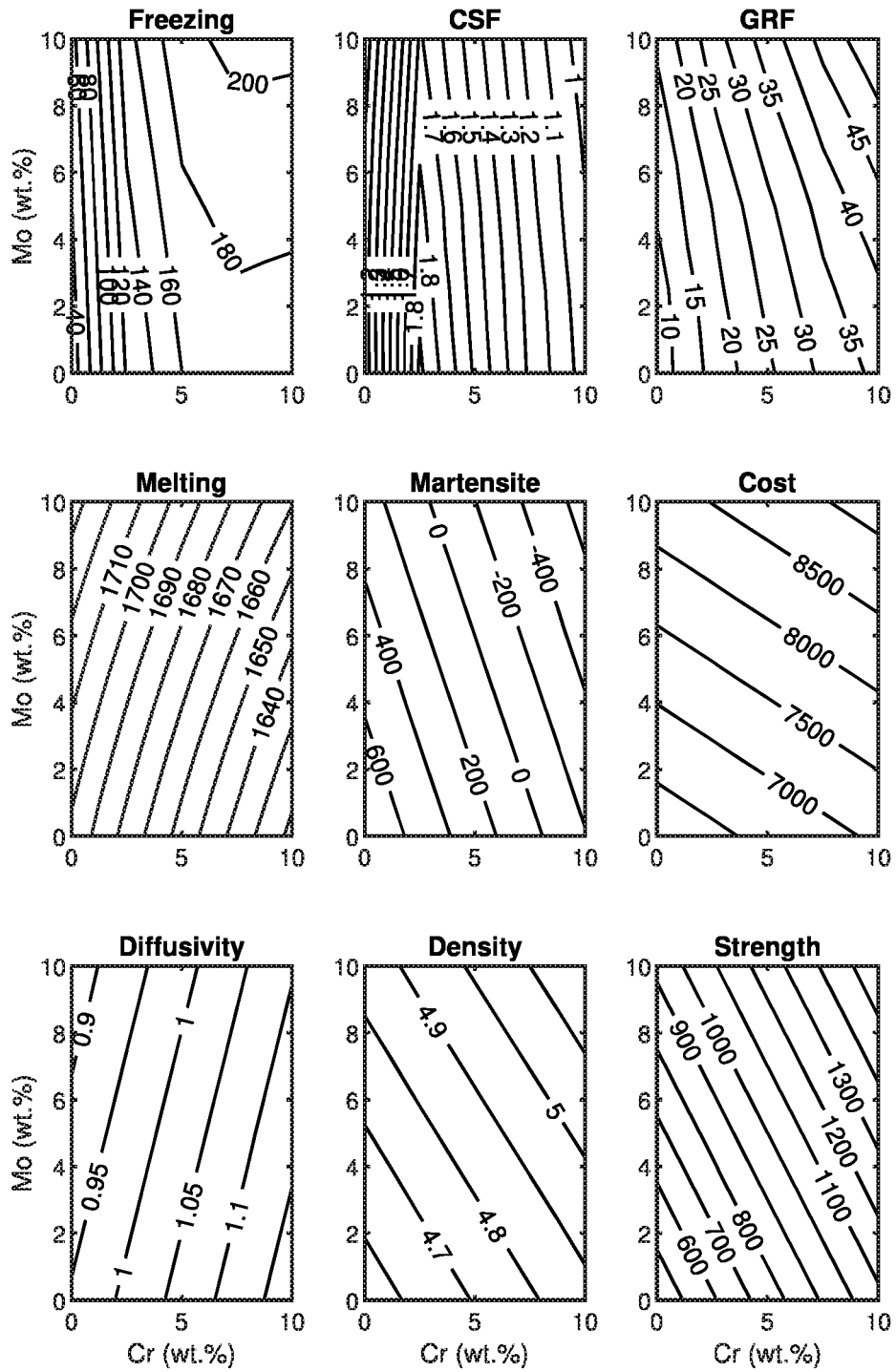
Figure 2: Contour maps of the merit indeces for the Ti-5Al-5V-YMo-XCr-0Fe-0Sn-0Zr-0Nb system.

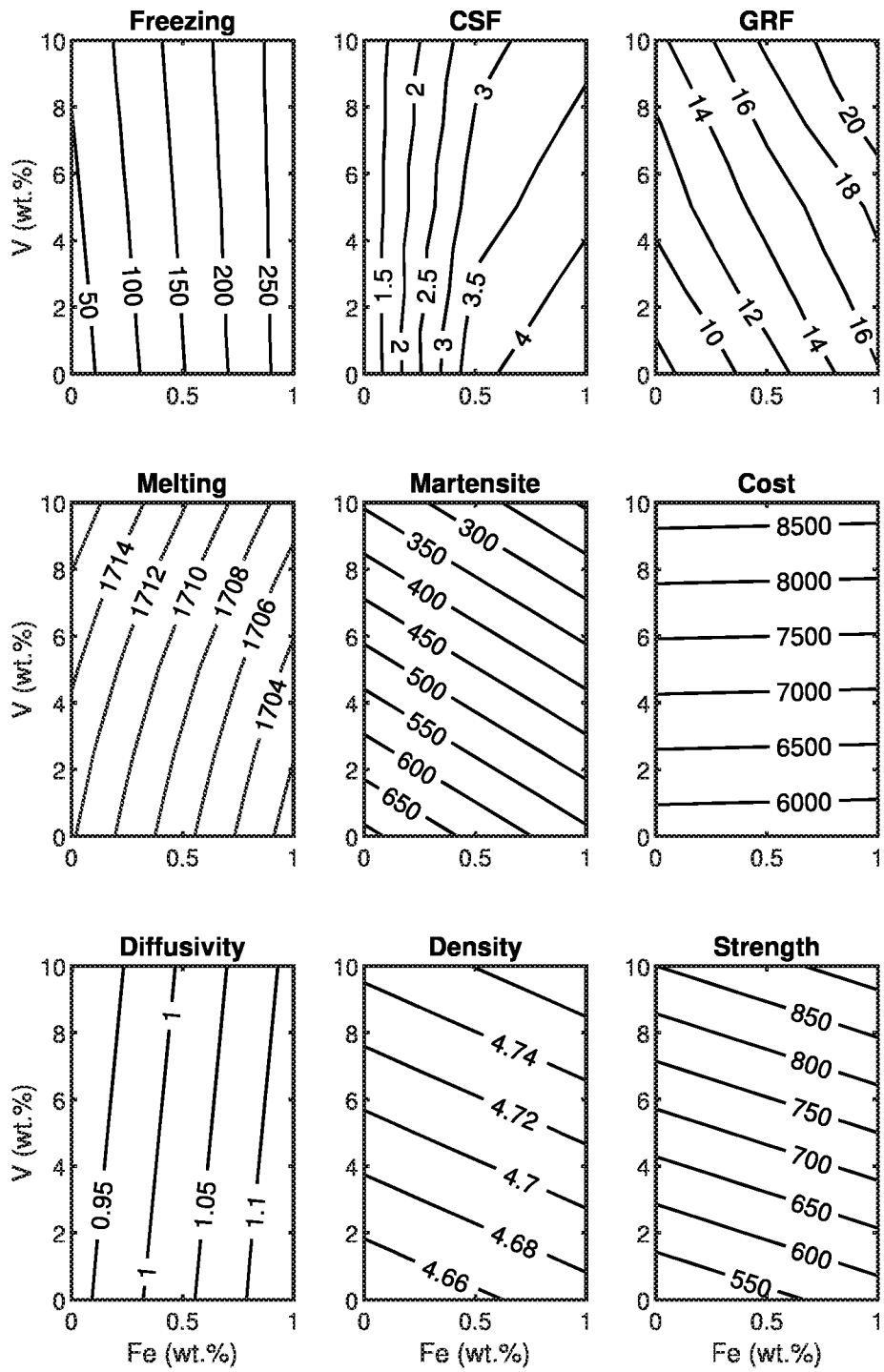
Figure 3: Contour maps of the merit indeces for the Ti-5Al-5Mo-YV-XFe-0Zr-0Sn-0Cr-0Nb system.

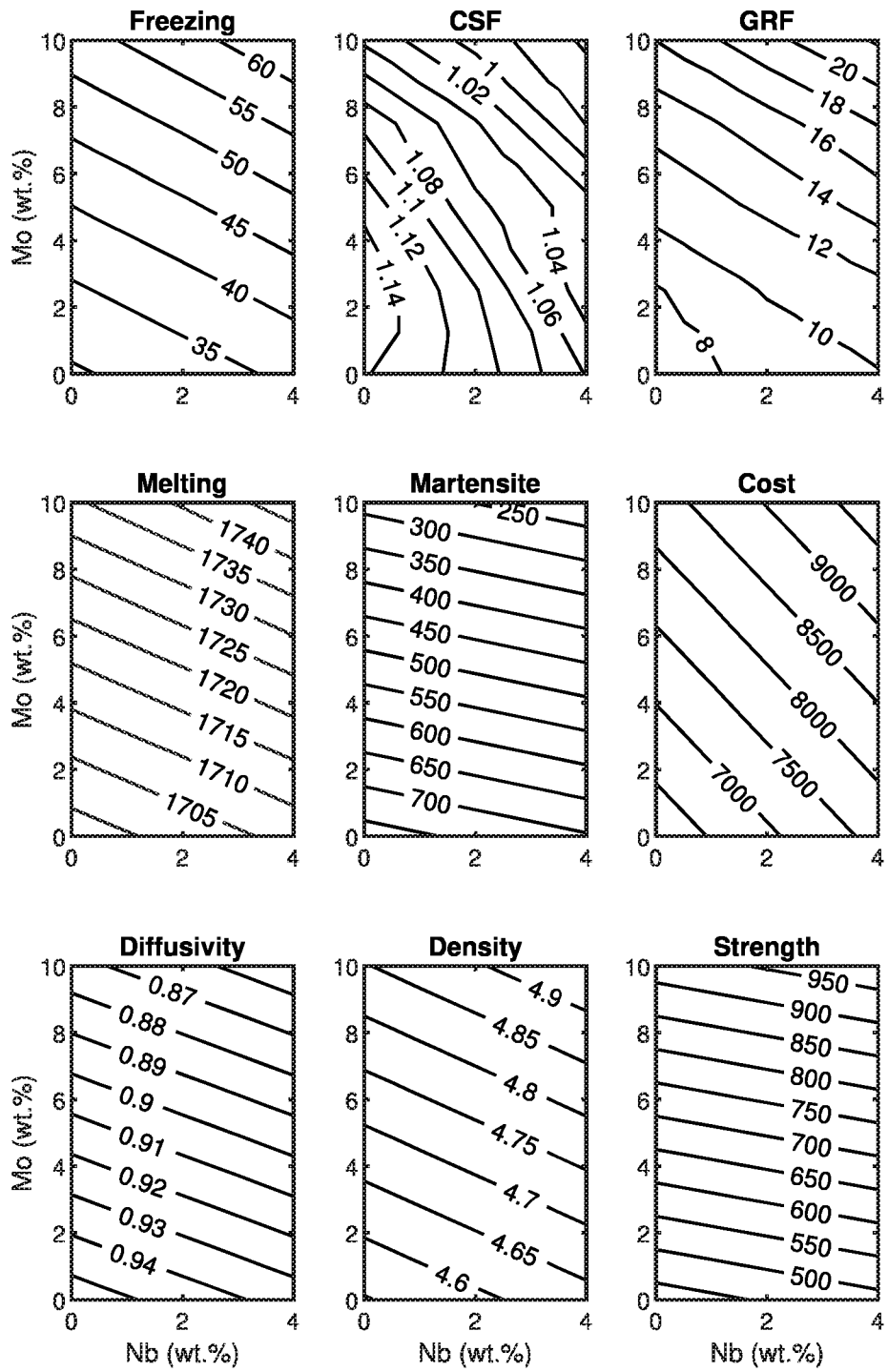
Figure 4: Contour maps of the merit indeces for the Ti-5Al-5V-YMo-XNb-0Fe-0Cr-0Zr-0Sn system.

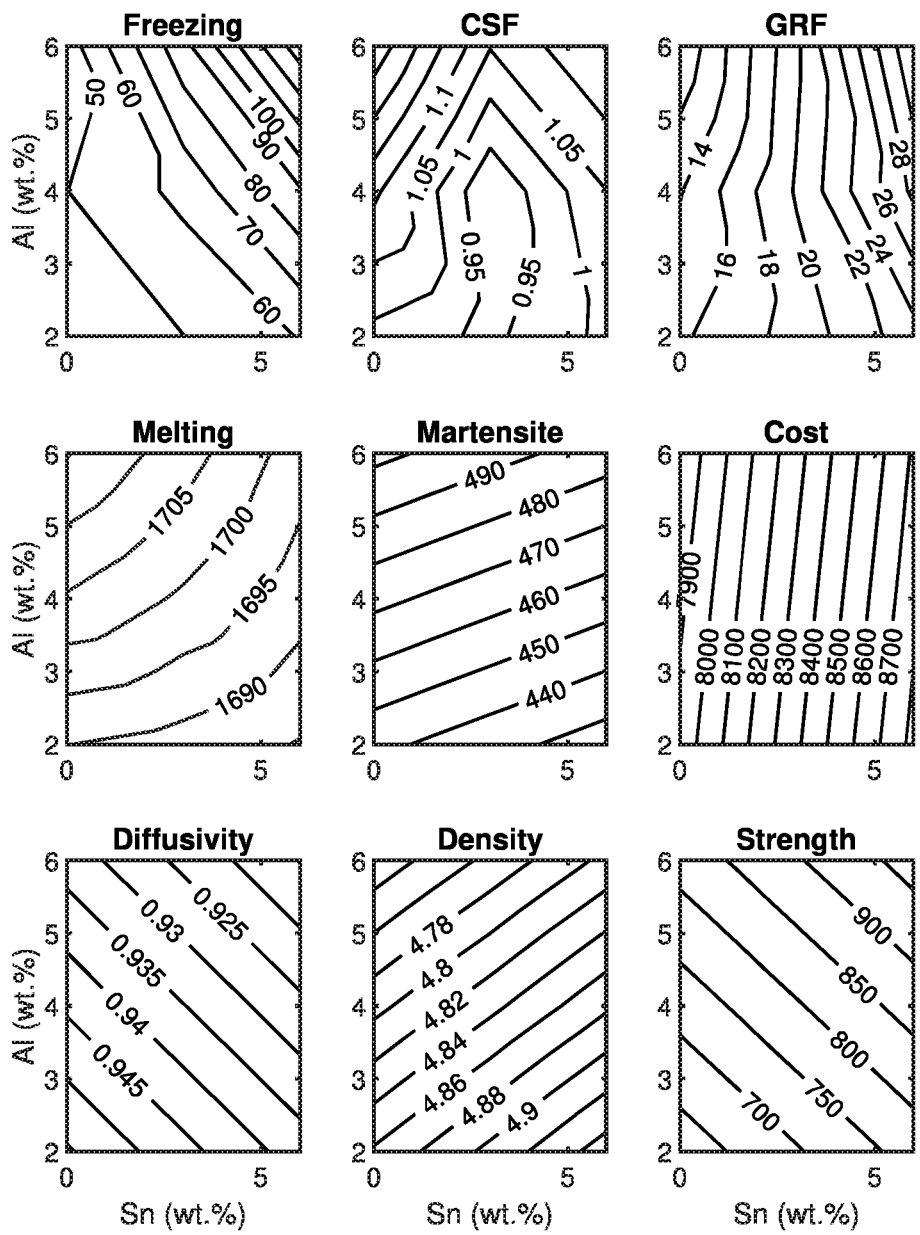
Figure 5: Contour maps of the merit indeces for the Ti-4Mo-4V-YAl-XSn-0Fe-0Cr-4Zr-0Sn system.

| Factor | V | Fe | Mo | Zr | Cr | Nb | Sn |
|---|---|---|---|---|---|---|---|
| 1. Solidification range (safe range 100-275°C) | ↑ | ↑↑↑↑ | ↑ | ↑ | ↑↑↑ | ↑ | ↑↑ |
| 2. CSC (lower is better) | - | ↑↑↑ | - | ↑ | ↑↑ | ↓ | ↓ |
| 3. GRF (higher is better) | ↑ | ↑↑ | ↑ | ↑ | ↑↑ | ↑↑ | ↑↑↑ |
| 4. Density (lower is better) | ↑ | ↑↑ | ↑↑↑ | ↑ | ↑ | ↑↑ | ↑↑ |
| 5. $M_s$ (optimal range 75-300°C) | ↓↓ | ↓↓↓↓ | ↓↓ | ↓ | ↓↓↓ | ↓ | ↓ |
| 6. Melting temperature (lower is better) | ↑ | ↓ | ↑ | ↑↑ | ↓↓ | ↑ | ↑↑ |
| 7. Beta strength (higher is better) | ↑↑ | ↑↑↑↑ | ↑↑ | ↑ | ↑↑↑ | ↑ | ↑ |
| 8. Diffusivity (lower is better) | ↓ | ↑↑↑↑ | ↓↓↓ | ↑ | ↑↑ | ↓↓ | ↓ |

Figure 6: Effect of alloy additions on merit indices.

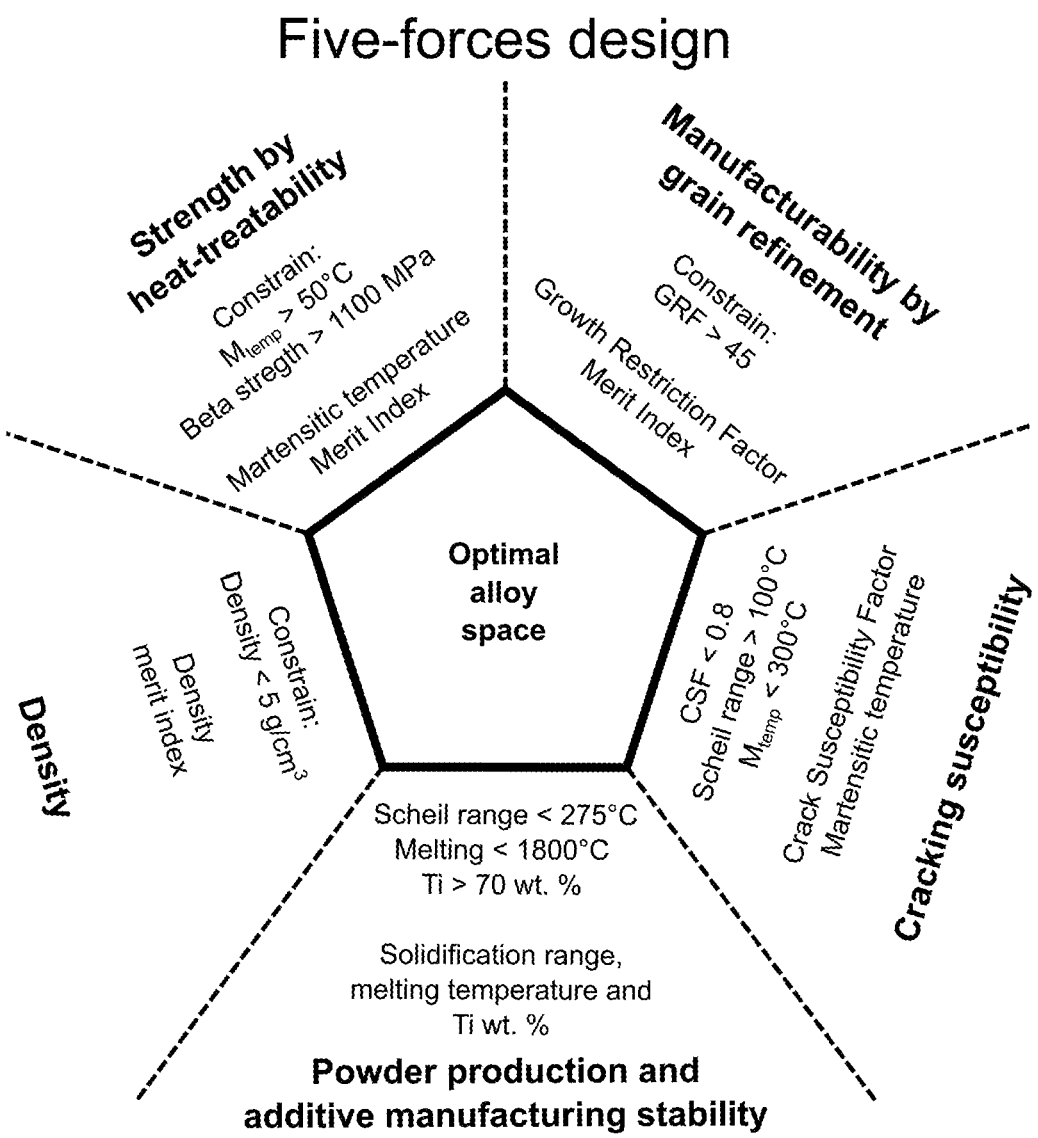
Figure 7: Merit index restrictions to isolate optimal alloy space.

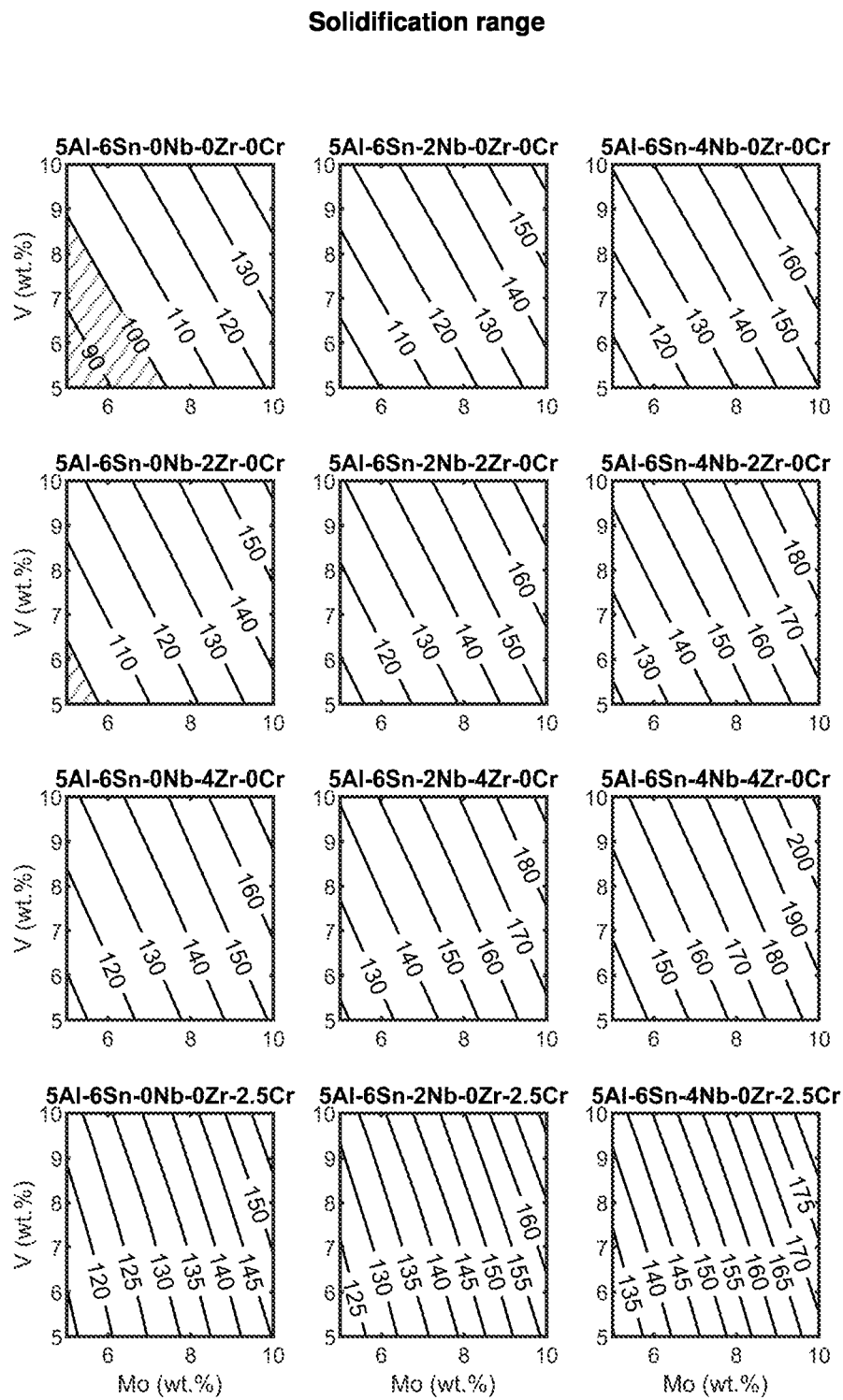
Figure 8: Contour map of the solidification range for the preferred alloy space.

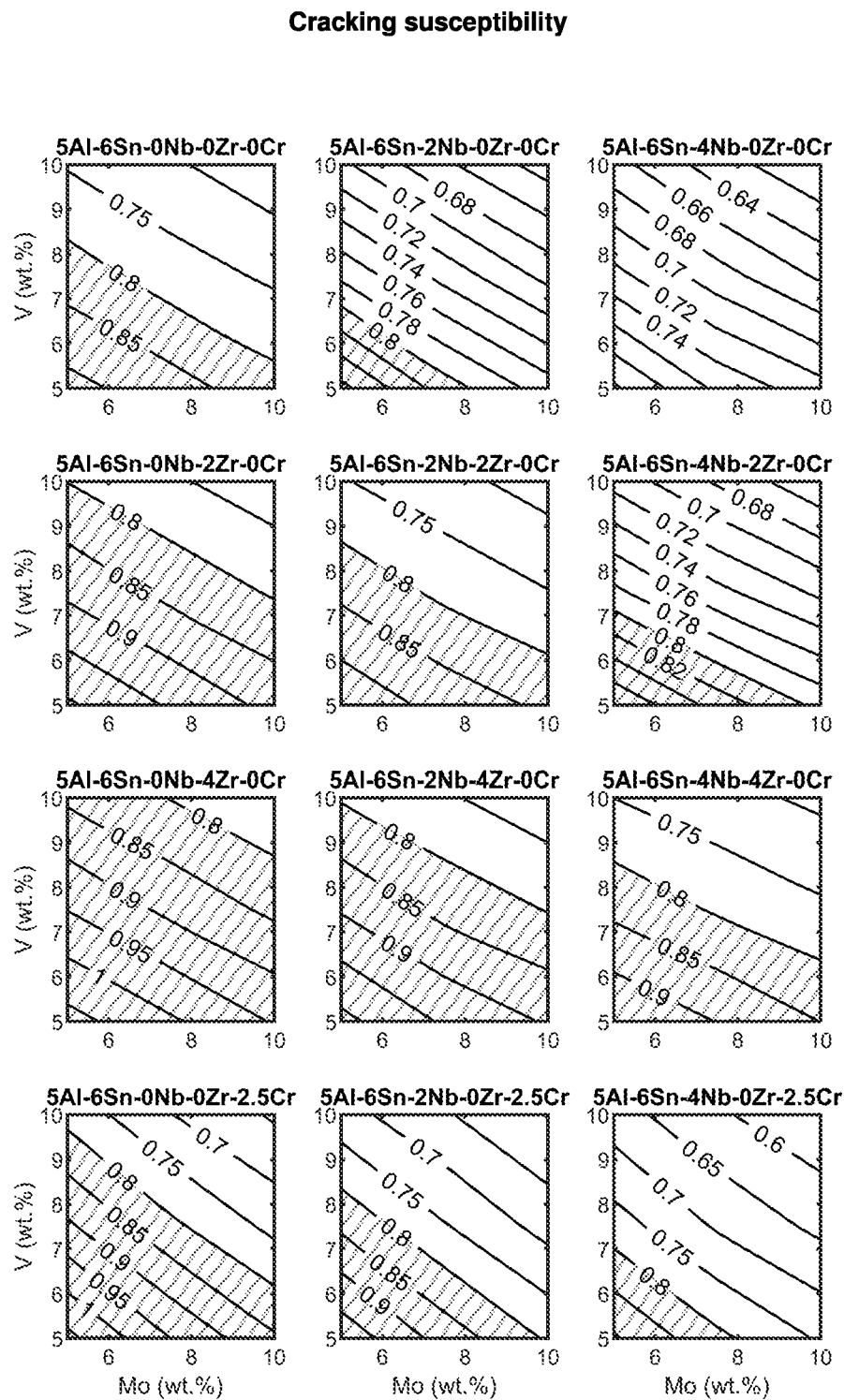
Figure 9: Contour map of the cracking susceptibility for the preferred alloy space.

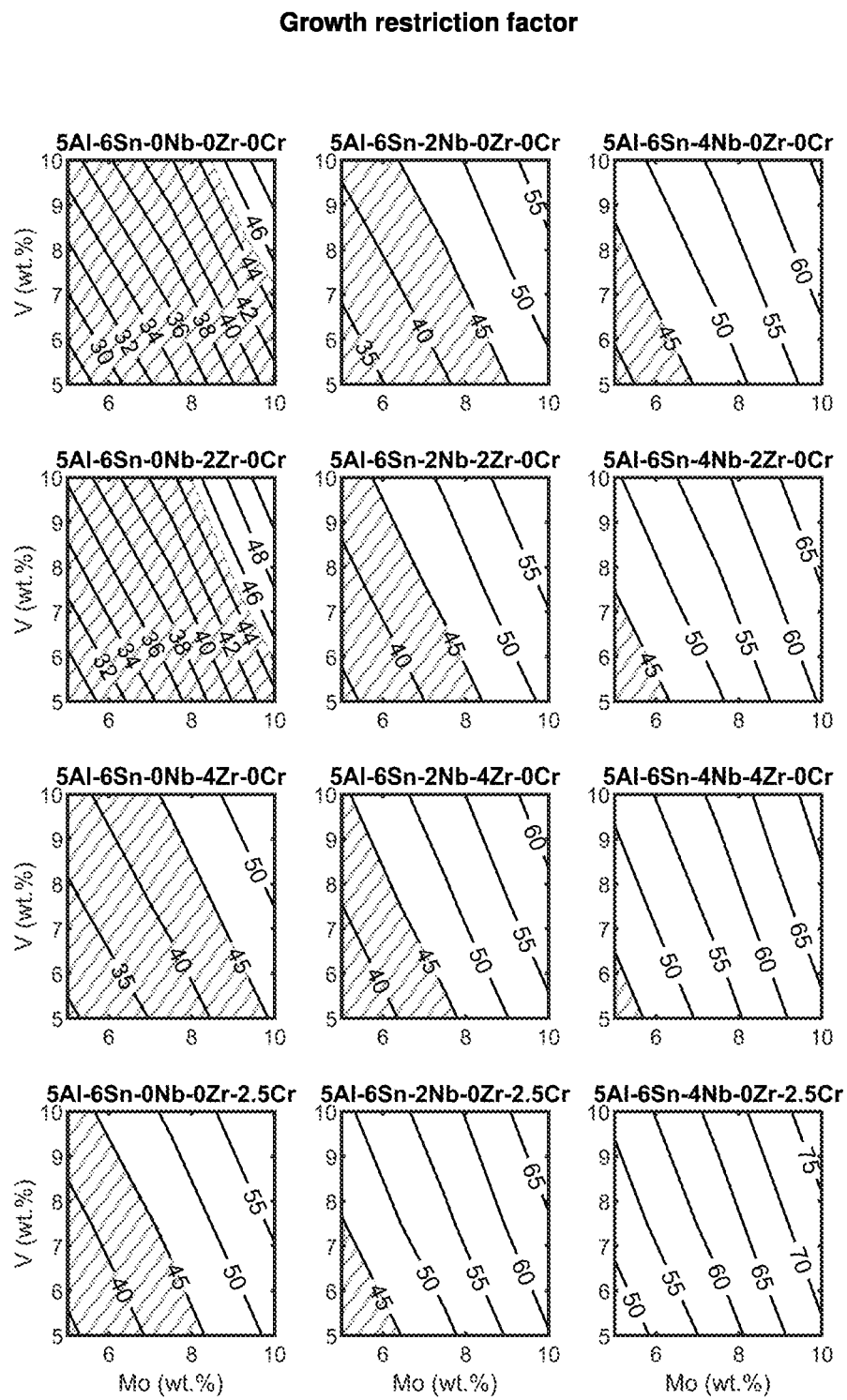
Figure 10: Contour map of the growth restriction factor for the preferred alloy space.

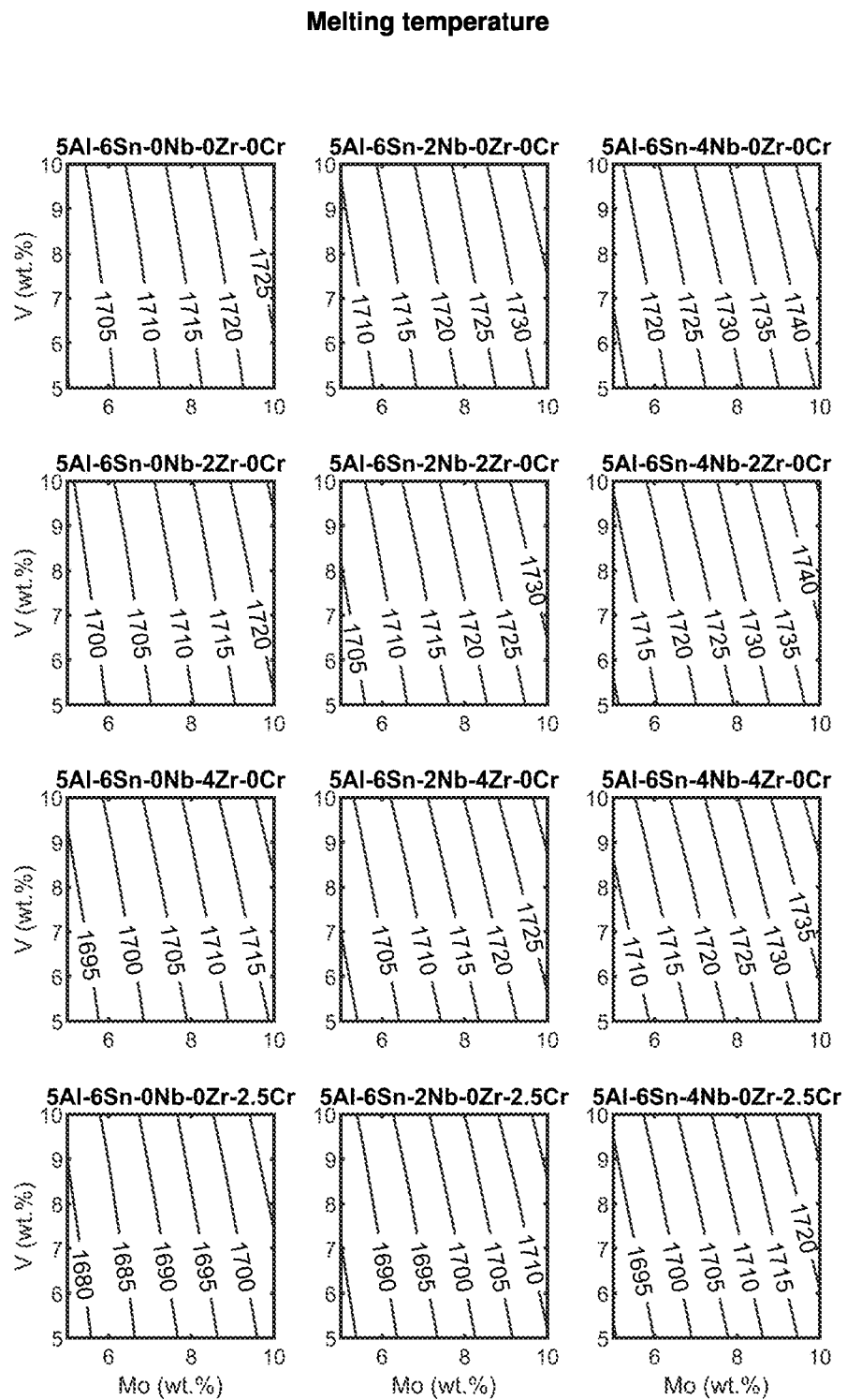
Figure 11: Contour map of the melting temperature for the preferred alloy space.

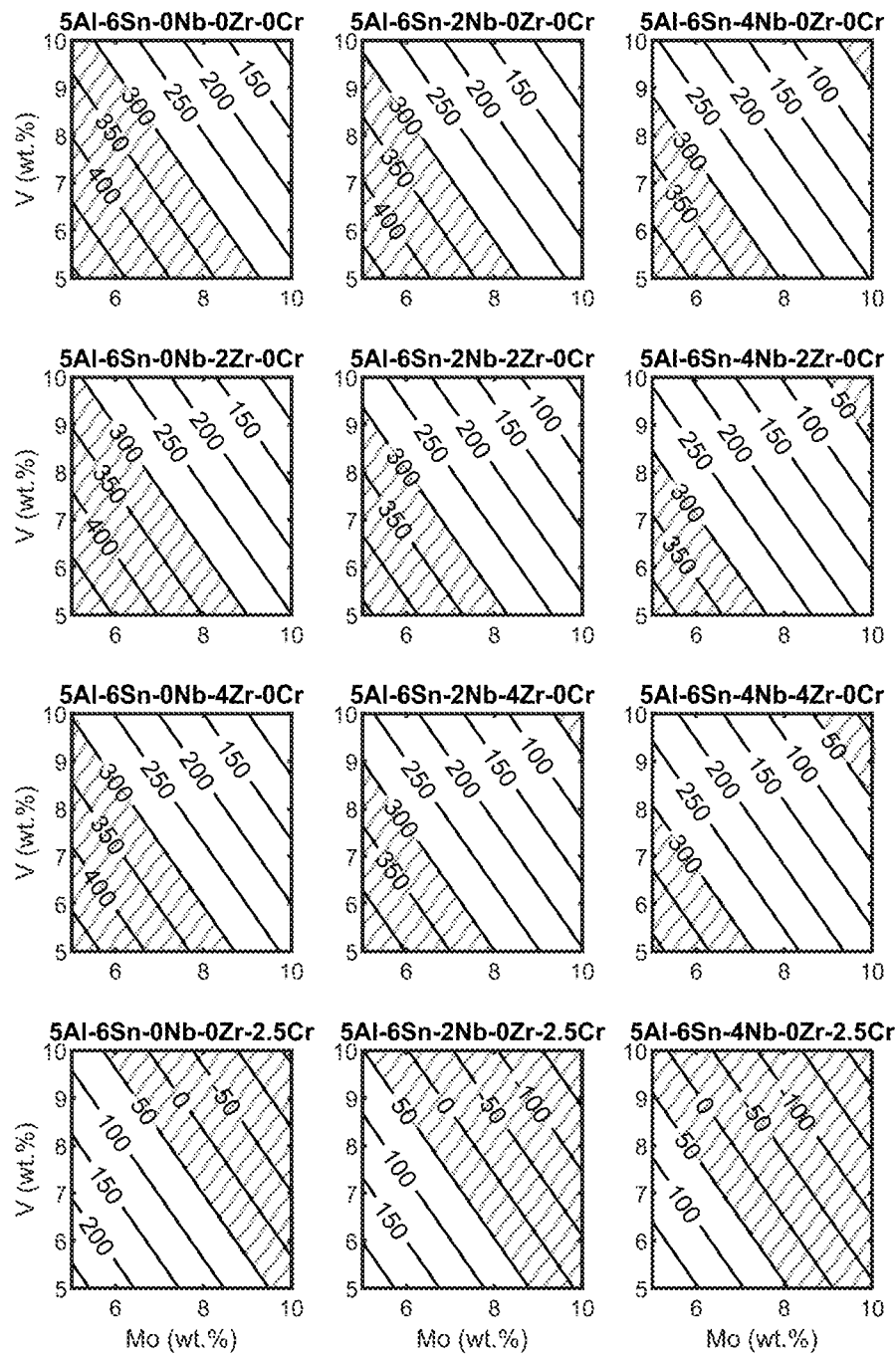
Figure 12: Contour map of the martensitic start temperature for the preferred alloy space.

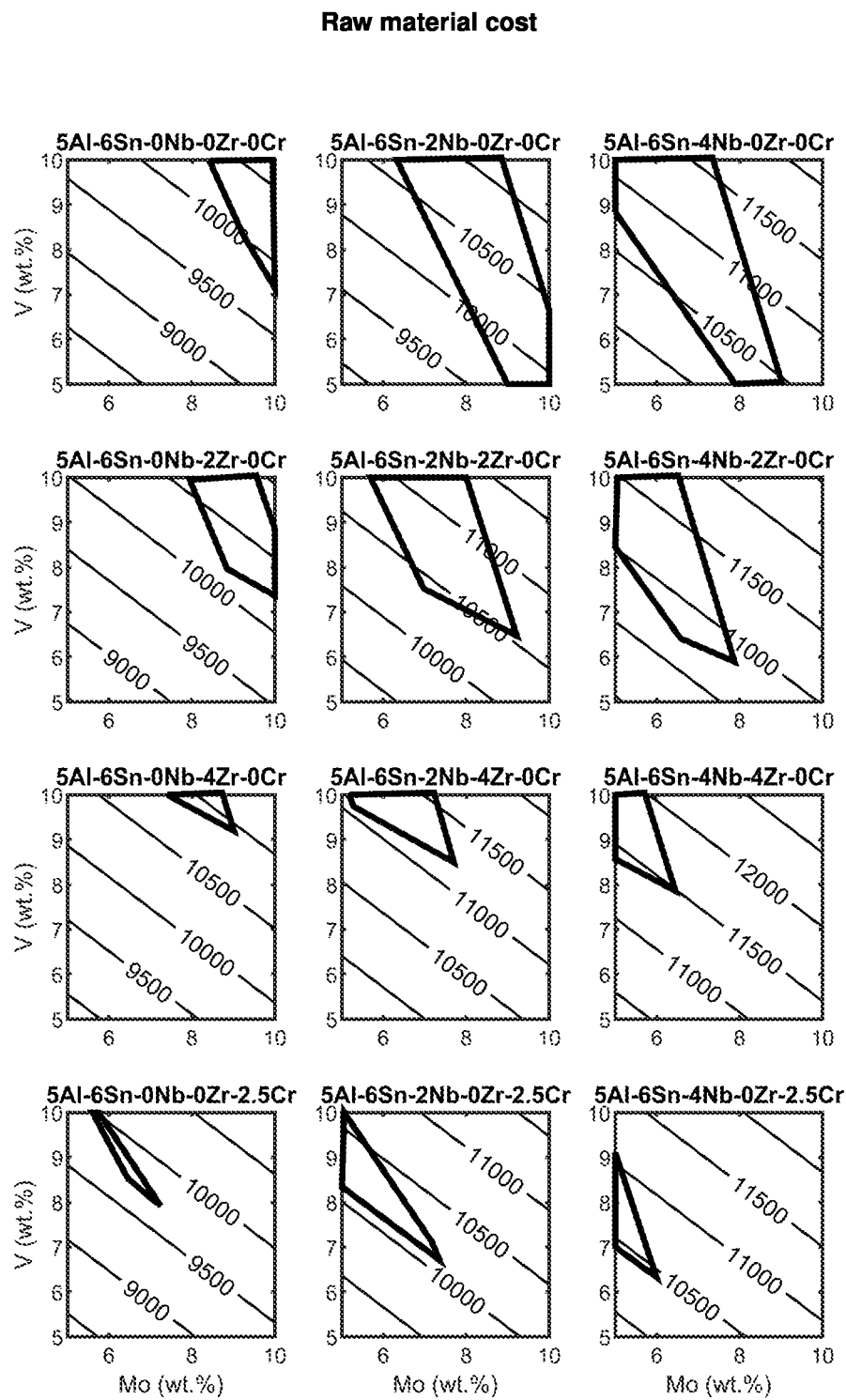
Figure 13: Contour map of the raw material cost for the preferred alloy space.

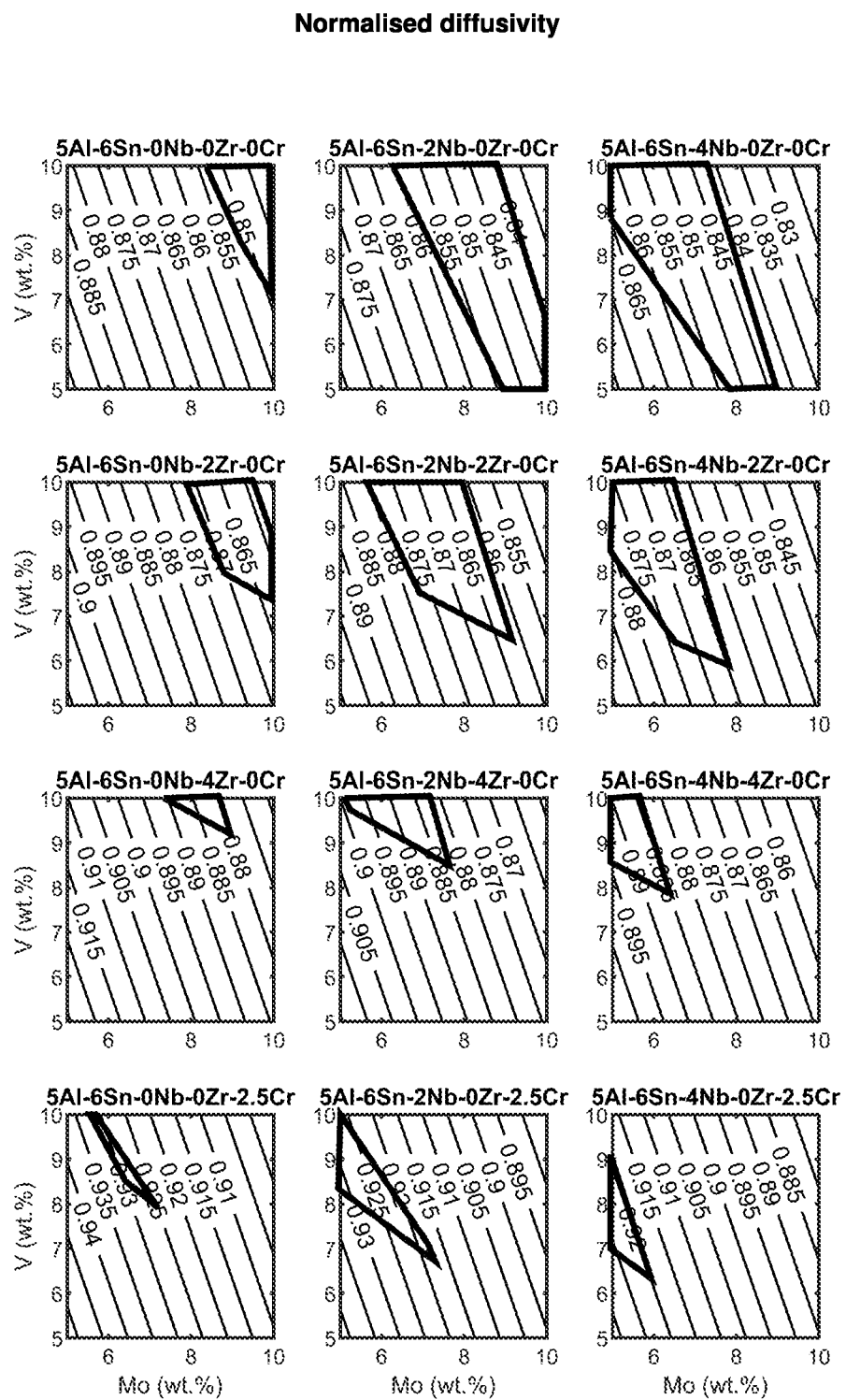
Figure 14: Contour map of the normalised diffusivity for the preferred alloy space.

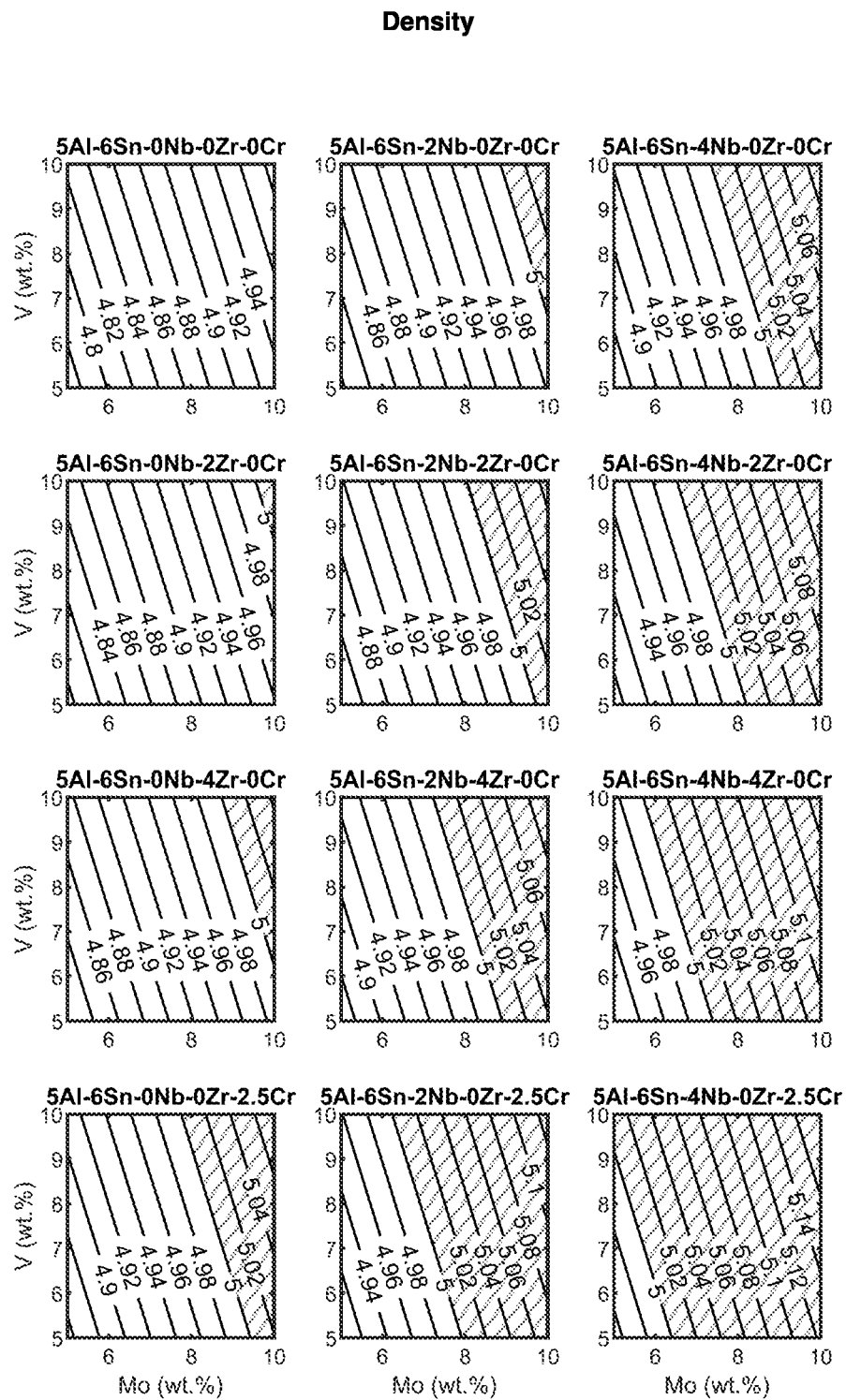
Figure 15: Contour map of the density for the preferred alloy space.

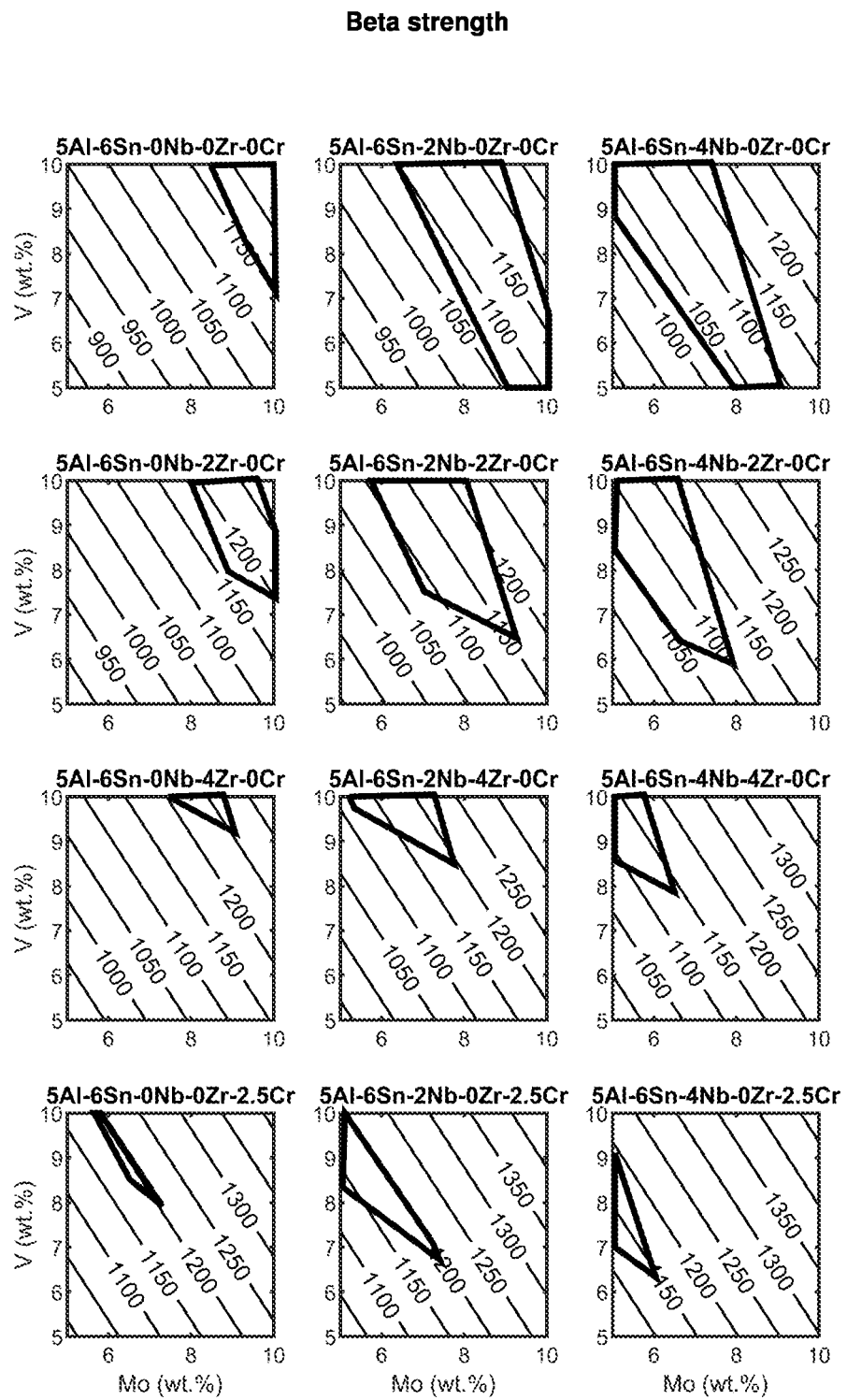
Figure 16: Contour map of the beta strength for the preferred alloy space.

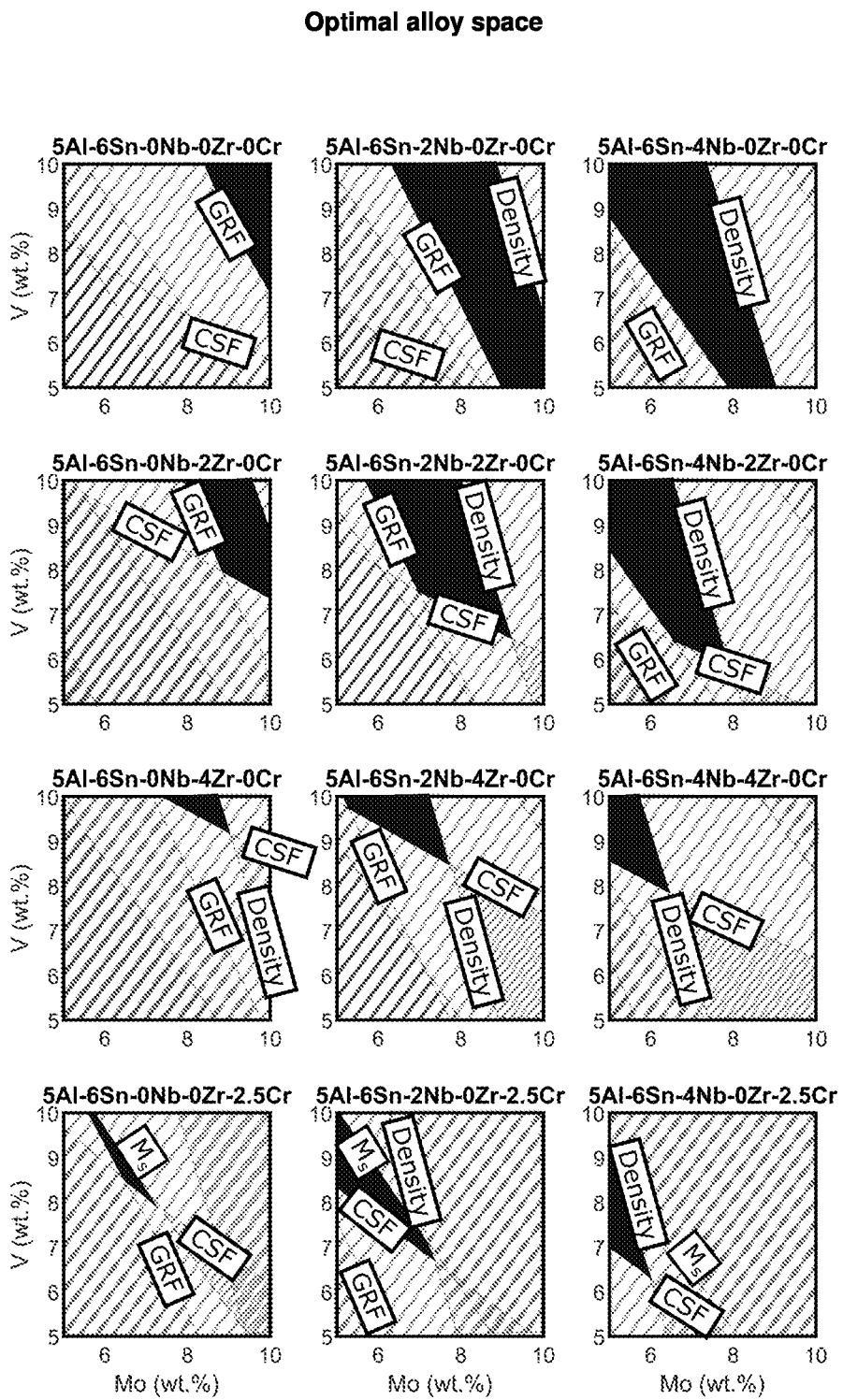
Figure 17: Optimal alloy space for the preferred alloy space.

Baseline alloys

| | Baseline alloys | Freez. | GRF | CSF | Mo eq. | $M_s$ | Ti wt.% | Melting | Density | Cost | Deff | Strength | Suitability |
|---|---|---|---|---|---|---|---|---|---|---|---|---|---|
| 1 | Ti-10V-2Fe-3Al | 392 | 28 | 3.1 | 9.5 | 258 | 85 | 1656 | 4.72 | 7638 | 1.38 | 650 | CSF too high, Freezing range too high, Strength too low |
| 2 | Ti-15Mo-2.7Nb-3Al-0.25i | 91 | 32 | 1 | 12.0 | 193 | 82 | 1746 | 5.10 | 9027 | 0.87 | 940.5 | Freezing range too low |
| 3 | Ti-3Al-8V-6Cr-4Mo-4Zr | 227 | 39 | 1.5 | 15.3 | -168 | 75 | 1640 | 5.01 | 9245 | 1.09 | 1100 | $M_s$ too low |
| 4 | Ti-15V-3Al-3Sn-3Cr | 110 | 26 | 1.4 | 11.9 | 85 | 79 | 1654 | 4.85 | 10108 | 1.02 | 945 | GRF too low |
| 5 | Ti-13V-11Cr-3Al | 155 | 43 | 0.9 | 23.3 | -609 | 73 | 1595 | 5.05 | 9651 | 1.19 | 1320 | $M_s$ too low |
| 6 | Ti-8Mo-8V-2Fe-3Al | 453 | 39 | 3.0 | 16.2 | -60 | 79 | 1693 | 4.95 | 8730 | 1.32 | 980 | $M_s$ too low, Freezing range too high, CSF too high |
| 7 | Ti-11Mo-6Zr-4.5Sn | 75 | 31 | 1.0 | 10.0 | 302 | 83 | 1699 | 5.16 | 9090 | 0.98 | 782.5 | Strength too low |
| 8 | Ti-10V-2Fe-3Al | 392 | 28 | 3.1 | 9.5 | 258 | 85 | 1656 | 4.72 | 7638 | 1.38 | 650 | CSF too high, Strength too low |
| 9 | Ti-5Al-5V-5Mo-3Cr | 147 | 22 | 1.8 | 8.2 | 240 | 82 | 1690 | 4.79 | 7500 | 0.98 | 870 | GRF too low |
| 10 | Ti-5Al-5V-5Mo-3Cr-0.5Fe | 227 | 27 | 2.3 | 9.6 | 165 | 81.5 | 1685 | 4.81 | 7477 | 1.09 | 907.5 | CSF too high |
| 11 | Ti-5Al-5V-5Mo-3Cr-1Zr | 157 | 23 | 1.8 | 8.0 | 233 | 81 | 1688 | 4.80 | 7679 | 0.99 | 890 | GRF too low |
| 12 | Ti-15Mo-3Al-3Nb | 65 | 32 | 0.7 | 12.0 | 193 | 82 | 1746 | 5.10 | 9153 | 0.87 | 945 | Freezing range too low |
| 13 | Ti-3Al-8V-6Cr-4Mo-4Zr | 227 | 39 | 1.5 | 15.3 | -168 | 75 | 1640 | 5.01 | 9245 | 1.09 | 1100 | $M_s$ too low |
| 14 | Ti-5Al-5V-5Mo-1Cr-1Fe | 292 | 23 | 3.3 | 7.9 | 282 | 83 | 1695 | 4.76 | 7269 | 1.15 | 815 | CSF too high, Freezing range too high |

Figure 18: Properties of the baseline alloys.

Example alloys

| | Example alloys* | Freez. | GRF | CSF | Mo eq. | $M_s$ | Ti wt.% | Melting | Density | Cost | Deff | Strength |
|---|---|---|---|---|---|---|---|---|---|---|---|---|
| 1 | Ti-5Al-6Sn-8V-6Mo-2Nb-2.5Cr | 133.6 | 49 | 0.778 | 10.36 | 75.85 | 78.5 | 1691.1 | 4.9696 | 10591 | 1 | 1172.5 |
| 2 | Ti-5Al-6Sn-8V-6Mo-2Nb-2Cr-1.5Zr | 147.1 | 51 | 0.8 | 9.85 | 65.35 | 77 | 1687.9 | 4.9899 | 10860 | 1.02 | 1202.5 |
| 3 | Ti-5Al-6Sn-9.5V-5.5Mo-4Nb-4Zr | 158.5 | 52 | 0.763 | 6.198 | 222.9 | 76 | 1714 | 4.987 | 12264 | 0.99 | 1147.5 |
| 4 | Ti-5Al-6Sn-7.5V-7Mo-4Nb-2Zr | 149.3 | 52 | 0.759 | 6.692 | 237.4 | 78.5 | 1723.2 | 4.9874 | 11620 | 0.97 | 1112.5 |
| 5 | Ti-5Al-6Sn-9V-9Mo-2Zr | 147.1 | 47 | 0.761 | 9.697 | 151.9 | 75 | 1719 | 4.97 | 10817 | 0.93 | 1205 |
| 6 | Ti-5Al-6Sn-8.5V-8Mo-2Nb-2Zr | 149.3 | 50 | 0.746 | 8.362 | 185.4 | 76.5 | 1721.4 | 4.9815 | 11294 | 0.95 | 1167.5 |
| 7 | Ti-5Al-6Sn-9.5V-8Mo-2Nb-0.5Zr | 144.6 | 50 | 0.683 | 9.282 | 158.9 | 77 | 1725.3 | 4.9723 | 11328 | 0.93 | 1172.5 |
| 8 | Ti-5Al-6Sn-10V-8Mo-4Zr | 155.4 | 47 | 0.789 | 9.033 | 149.9 | 73 | 1711.2 | 4.975 | 11265 | 0.95 | 1230 |

*all example alloys contain 0.1%B

Figure 19: Properties of the proposed examples.

Optimal alloy space

| Claim 1* | Al | Sn | V | Mo | Nb | Zr | Cr | Fe | B |
|---|---|---|---|---|---|---|---|---|---|
| Lower limit | 3 | 0 | 3 | 3 | 0 | 0 | 0 | 0 | 0 |
| Upper limit | 7 | 7 | 10 | 10 | 5 | 6 | 4 | 0.5 | 0.5 |

*only showing main elements while: $0.027V + 0.178Fe + 0.055Mo + 0.016Zr + 0.044Cr + 0.033Nb + 0.053Sn > 1.0$ Figure 20: Chemistry range of the optimal alloy space.

Restriction for optimal alloy space

| Baseline alloys | | Al | V | Fe | Mo | Zr | Cr | Nb | Sn | GRF Threshold | GRF Actual | CSF Threshold | CSF Actual |
|---|---|---|---|---|---|---|---|---|---|---|---|---|---|
| 1 | * | 3 | 10 | 2 | 0 | 0 | 0 | 0 | 0 | 0.63 | 28 | 7.83 | 3.12 |
| 2 | * | 3 | 0 | 0 | 15 | 0 | 0 | 2.7 | 0 | 0.82 | 32 | -0.15 | 1.20 |
| 3 | * | 3 | 8 | 0 | 4 | 4 | 6 | 0 | 0 | 0.82 | 39 | 1.43 | 1.51 |
| 4 | * | 3 | 15 | 0 | 0 | 0 | 3 | 0 | 3 | 0.74 | 26 | 0.06 | 1.43 |
| 5 | * | 3 | 13 | 0 | 0 | 0 | 11 | 0 | 0 | 0.98 | 43 | 2.38 | 0.26 |
| 6 | * | 3 | 8 | 2 | 8 | 0 | 0 | 0 | 0 | 0.96 | 39 | 7.77 | 3.00 |
| 7 | * | 0 | 0 | 0 | 11 | 6 | 0 | 0 | 4.5 | 0.88 | 31 | -0.45 | 0.96 |
| 8 | * | 3 | 10 | 2 | 0 | 0 | 0 | 0 | 0 | 0.63 | 28 | 7.83 | 3.12 |
| 9 | | 5 | 5 | 0 | 5 | 0 | 3 | 0 | 0 | 0.55 | 22 | 2.70 | 1.78 |
| 10 | | 5 | 5 | 0.5 | 5 | 0 | 3 | 0 | 0 | 0.64 | 27 | 2.70 | 2.26 |
| 11 | | 5 | 5 | 0 | 5 | 1 | 3 | 0 | 0 | 0.57 | 23 | 0.74 | 1.85 |
| 12 | * | 3 | 0 | 0 | 15 | 0 | 0 | 3 | 0 | 0.83 | 32 | -0.16 | 0.65 |
| 13 | * | 3 | 8 | 0 | 4 | 4 | 6 | 0 | 0 | 0.82 | 39 | 1.43 | 1.51 |
| 14 | * | 5 | 5 | 1 | 5 | 0 | 1 | 0 | 0 | 0.83 | 23 | 4.22 | 3.28 |

\* Outside range of Claim 1

| Examples | Al | V | Fe | Mo | Zr | Cr | Nb | Sn | GRF Threshold | GRF Actual | CSF Threshold | CSF Actual |
|---|---|---|---|---|---|---|---|---|---|---|---|---|
| 1 | 5 | 8 | 0 | 6 | 0 | 2.5 | 2 | 6 | 1.04 | 49 | -0.24 | 0.78 |
| 2 | 5 | 8 | 0 | 6 | 2 | 2 | 1.5 | 6 | 1.03 | 51 | -0.27 | 0.80 |
| 3 | 5 | 9.5 | 0 | 5.5 | 4 | 0 | 4 | 6 | 1.05 | 52 | -0.76 | 0.76 |
| 4 | 5 | 7.5 | 0 | 7 | 2 | 0 | 4 | 6 | 1.03 | 52 | -0.80 | 0.76 |
| 5 | 5 | 9 | 0 | 9 | 2 | 0 | 0 | 6 | 1.04 | 47 | -0.80 | 0.76 |
| 6 | 5 | 8.5 | 0 | 8 | 2 | 0 | 2 | 6 | 1.04 | 50 | -0.81 | 0.75 |
| 7 | 5 | 9.5 | 0 | 8 | 0.5 | 0 | 2 | 6 | 1.04 | 50 | -0.89 | 0.68 |
| 8 | 5 | 10 | 0 | 8 | 4 | 0 | 0 | 6 | 1.05 | 47 | -0.74 | 0.79 |

Threshold equations
GRF  $0.027V + 0.178Fe + 0.055Mo + 0.016Zr + 0.044Cr + 0.033Nb + 0.053Sn > 1.0$
CSF  $0.041Al - 0.03V + 4Fe - 0.015Mo + 0.037Zr + 0.24Cr - 0.02Nb - 0.112Sn < 0.0$ Figure 21: Relationship that restricts the optimal alloy space.

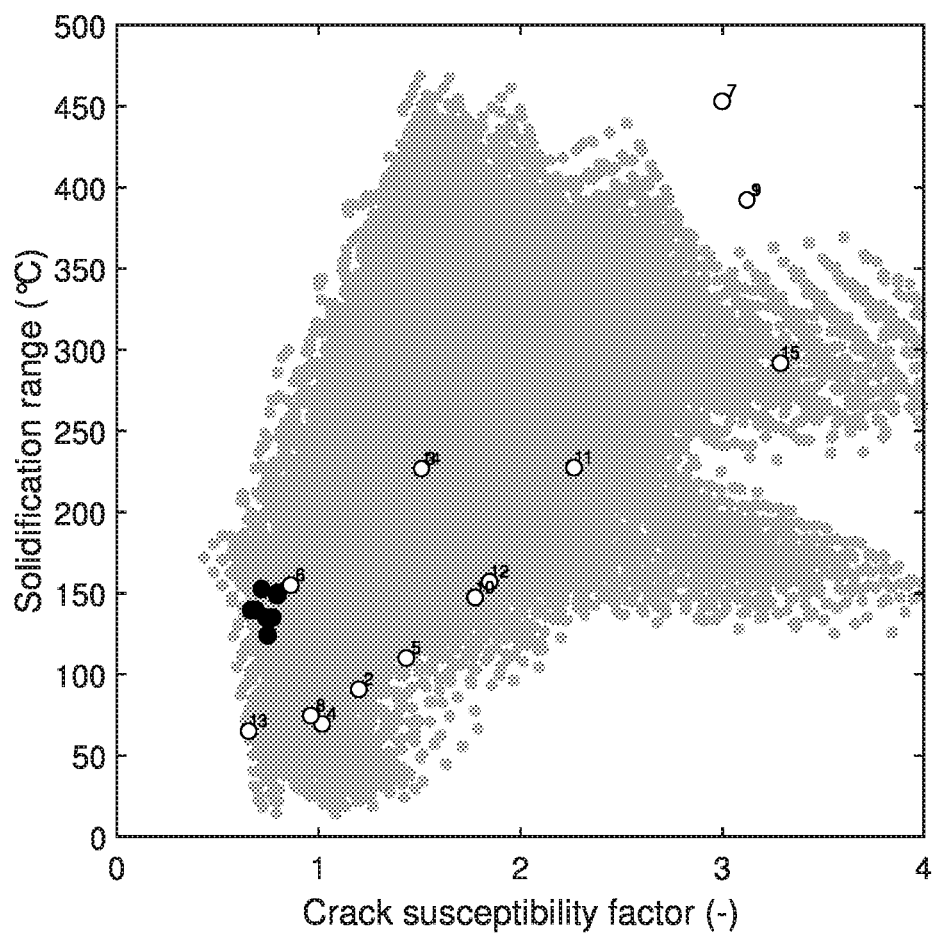
Figure 22: Scatter plot of the crack susceptibility factor against the solidification range.

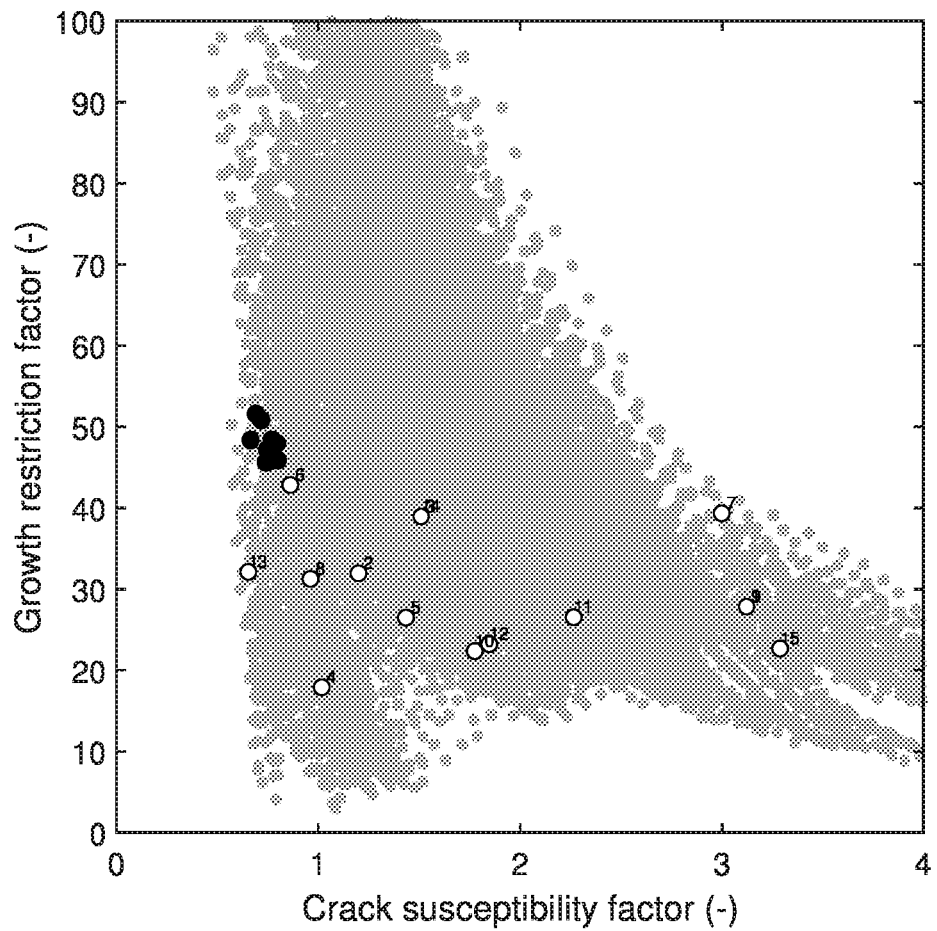
Figure 23: Scatter plot of the crack susceptibility factor against the growth restriction factor.

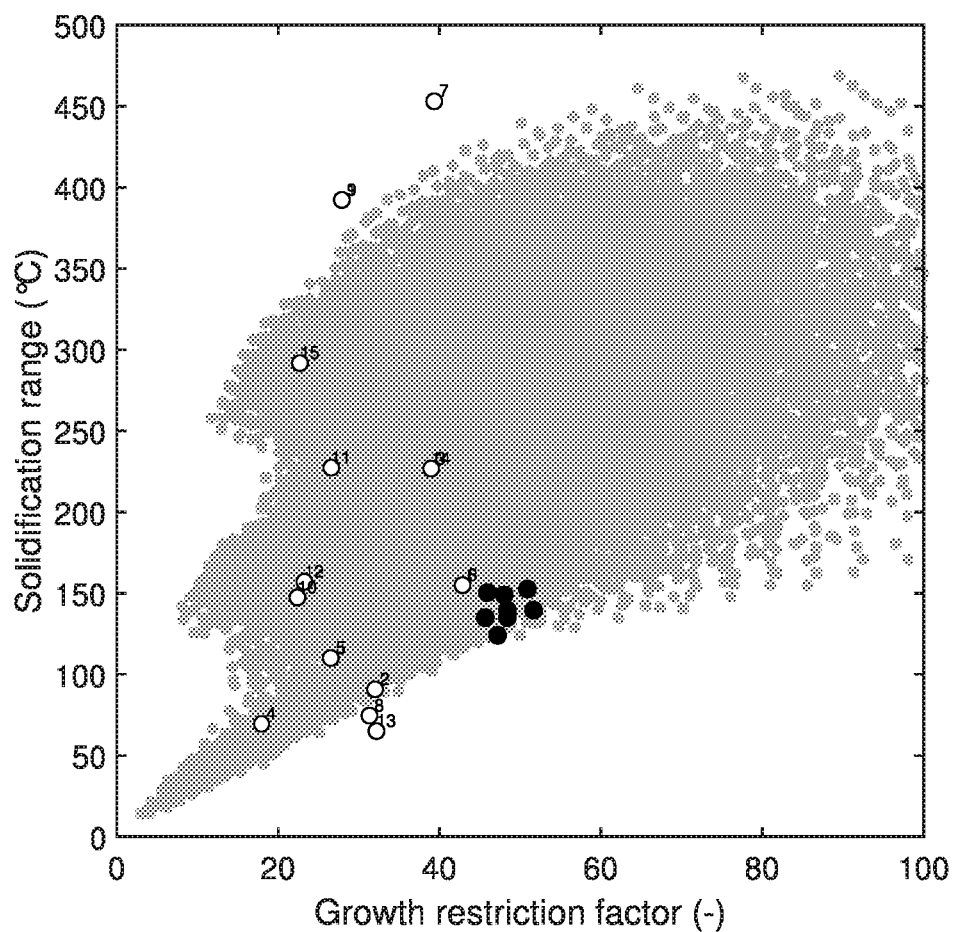
Figure 24: Scatter plot of the growth restriction factor against the solidification range.

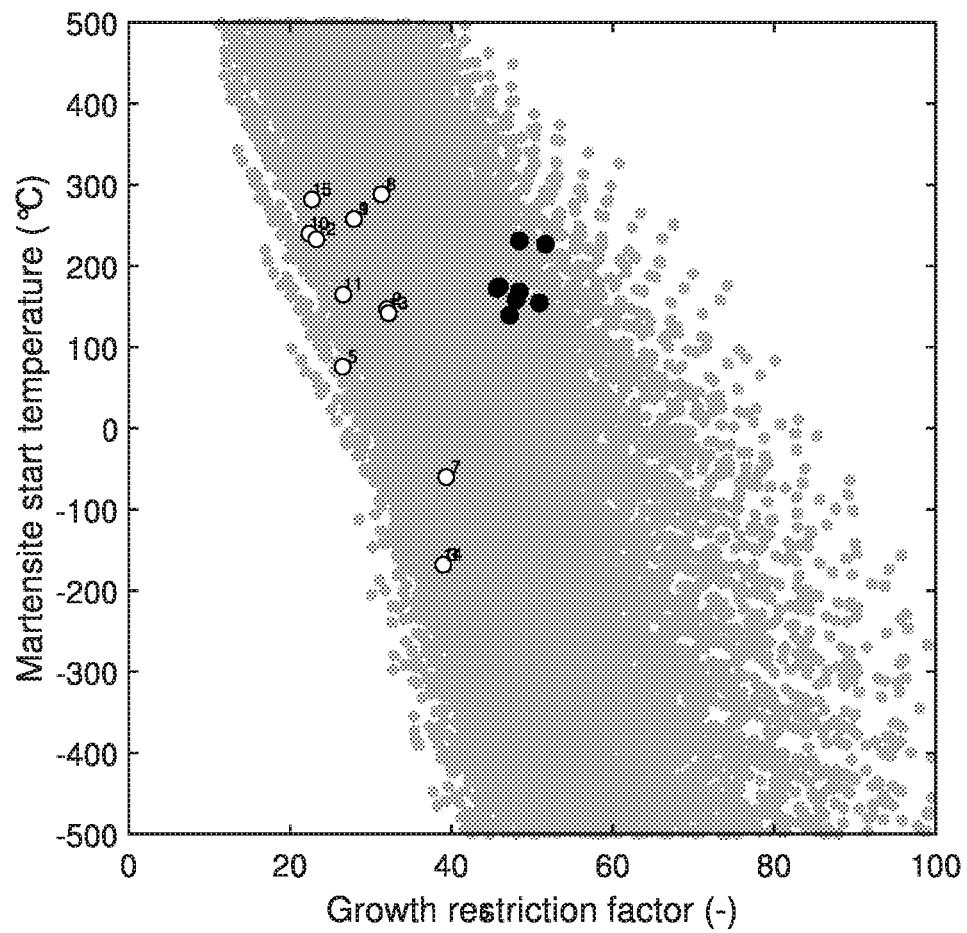
Figure 25: Scatter plot of the growth restriction factor against the martensite start temperature.

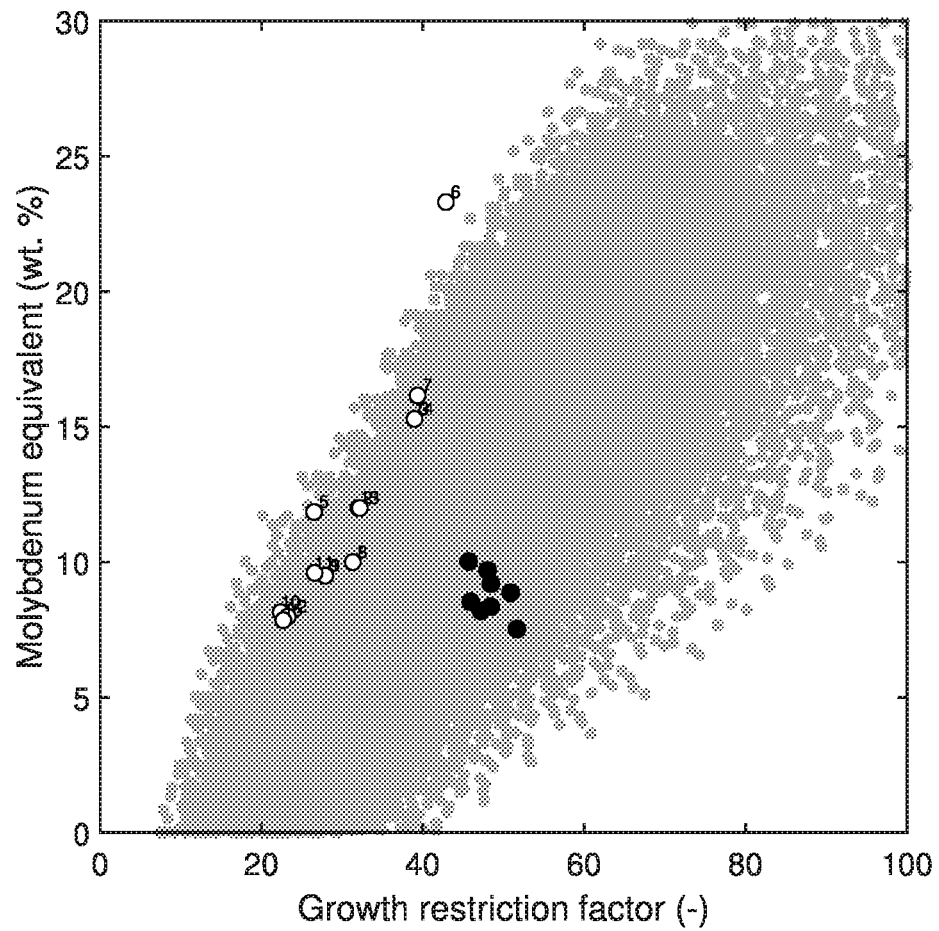
Figure 26: Scatter plot of the growth restriction factor against the molybdenum equivalent value.

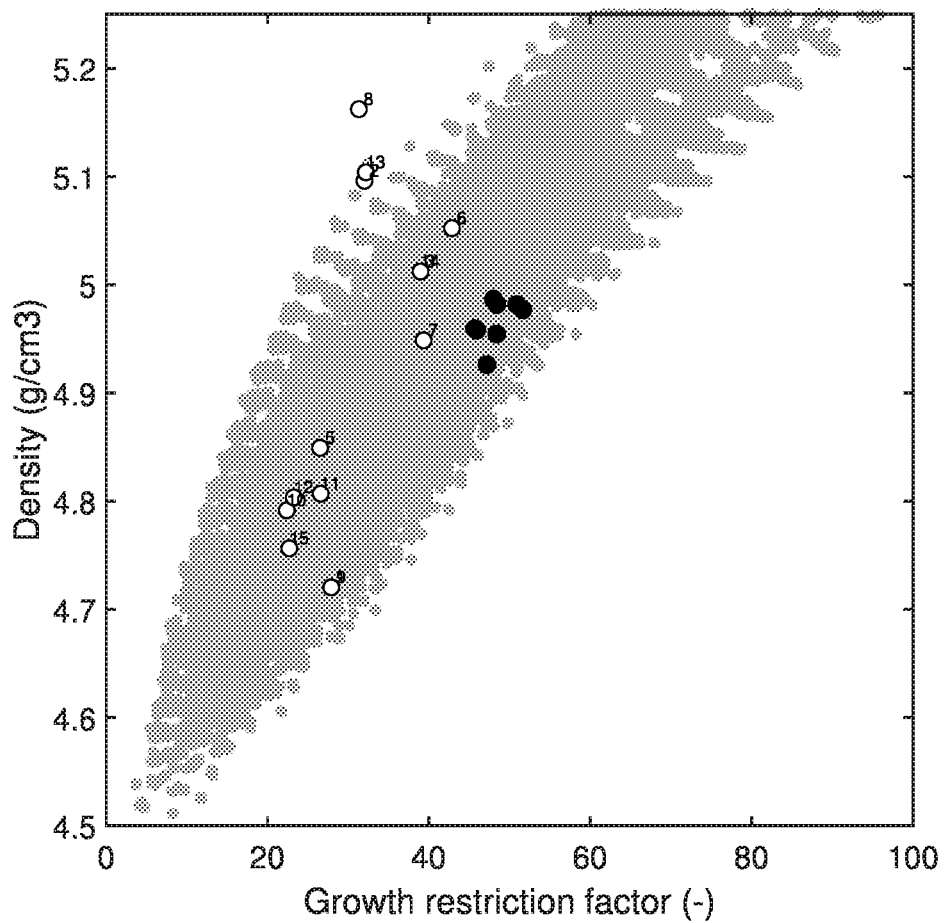
Figure 27: Scatter plot of the growth restriction factor against the density.

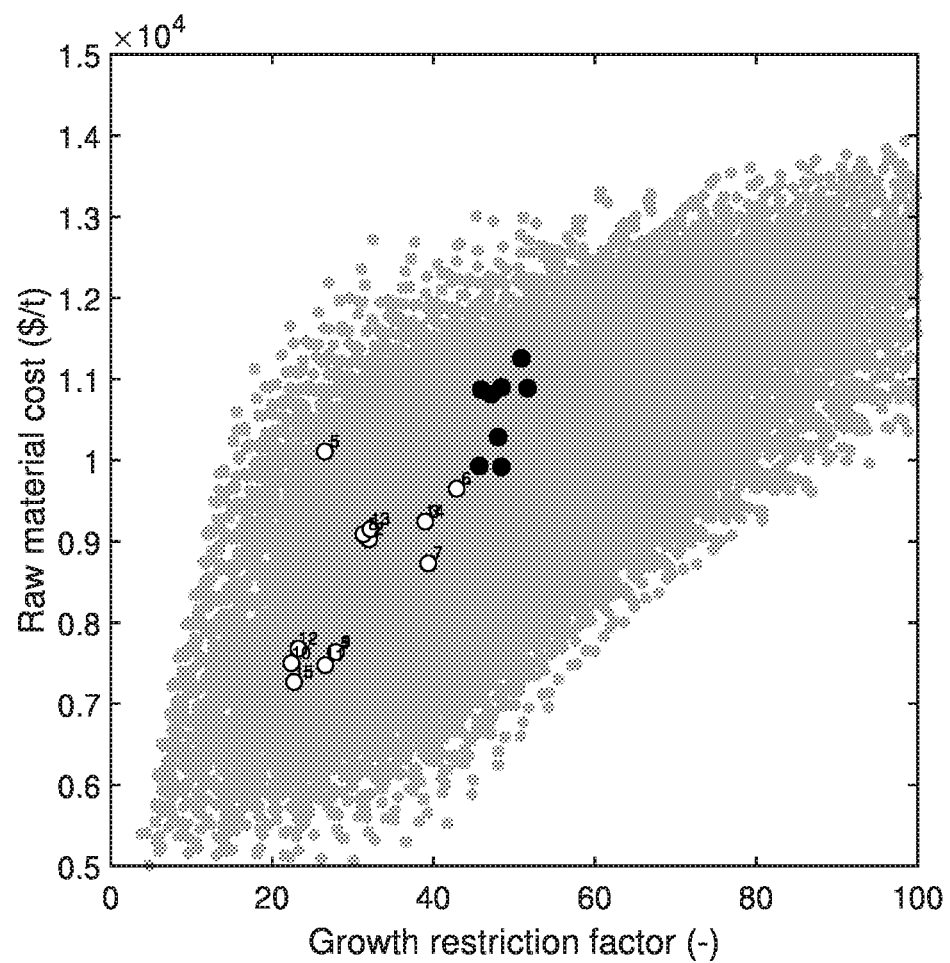
Figure 28: Scatter plot of the growth restriction factor against the raw material cost.

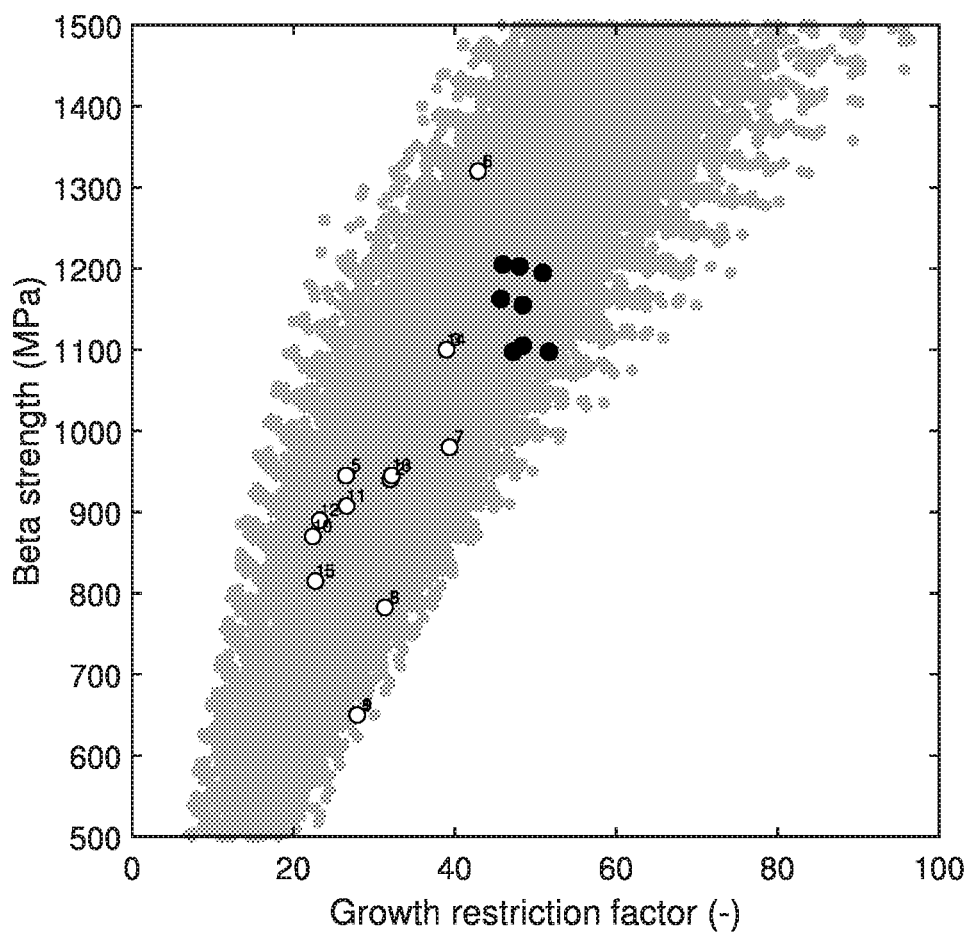
Figure 29: Scatter plot of the growth restriction factor against the beta strength.

BETA TITANIUM ALLOY FOR ADDITIVE MANUFACTURING

CROSS REFERENCE TO RELATED APPLICATIONS

This application is a national phase under 35 U.S.C. § 371 of International Application No. PCT/GB2019/052688, filed Sep. 24, 2019, which claims priority to United Kingdom Patent Application No. GB 1815532.5, filed Sep. 24, 2018. The entire contents of the referenced applications are incorporated into the present application by reference.

The present invention relates to titanium-based alloy compositions designed for enhanced additive manufacturing during selective laser melting (SLM) powder processes which has properties comparable to or improved over existing alloys. Moreover, the alloy desirably exhibits a formability window—in terms of cracking susceptibility, solidification range and microstructure stability—which is comparable to or wider than equivalent grades of alloy. The mechanical performance at operative conditions have also been weighted in the design process of the new alloy.

Examples of typical compositions of beta Ti-alloys are listed in Table 1.

TABLE 1

Nominal composition in wt. % of commercially used beta titanium alloys.

| Alloy | Al | V | Fe | Mo | Cr | Zr | Nb | Si | Sn | Ti |
|---|---|---|---|---|---|---|---|---|---|---|
| Ti—10V—2Fe—3Al | 3 | 10 | 2 | — | — | — | — | — | — | Bal. |
| Ti—15Mo—2.7Nb—3Al—0.2Si | 3 | — | — | 15 | — | — | 2.7 | 0.2 | — | Bal. |
| Ti—3Al—8V—6Cr—4Mo—4Zr | 3 | 8 | — | 4 | 6 | 4 | — | — | — | Bal. |
| Ti—15V—3Al—3Sn—3Cr | 3 | 15 | — | — | 3 | — | — | — | 3 | Bal. |
| Ti—13V—11Cr—3Al | 3 | 13 | — | — | 11 | — | — | — | — | Bal. |
| Ti—8Mo—8V—2Fe—3Al | 3 | 8 | 2 | 8 | — | — | — | — | — | Bal. |
| Ti—11Mo—6Zr—4.5Sn | — | — | — | 11 | — | 6 | — | — | 4.5 | Bal. |
| Ti—10V—2Fe—3Al | 3 | 10 | 2 | — | — | — | — | — | — | Bal. |
| Ti—5Al—5V—5Mo—3Cr | 5 | 5 | — | 5 | 3 | — | — | — | — | Bal. |
| Ti—5Al—5V—5Mo—3Cr—0.5Fe | 5 | 5 | 0.5 | 5 | 3 | — | — | — | — | Bal. |
| Ti—5Al—5V—5Mo—3Cr—1Zr | 5 | 5 | — | 5 | 3 | 1 | — | — | — | Bal. |
| Ti—15Mo—3Al—3Nb | 3 | — | — | 15 | — | — | 3 | — | — | Bal. |
| Ti—3Al—8V—6Cr—4Mo—4Zr | 3 | 8 | — | 4 | 6 | 4 | — | — | — | Bal. |
| Ti—5Al—5V—5Mo—1Cr—1Fe | 5 | 5 | 1 | 5 | 1 | — | — | — | — | Bal. |

It is an aim of the invention to provide an alloy suitable for additive manufacturing, preferably which has improved additive manufacturability in comparison with the traditional beta titanium alloys listed in Table 1.

Preferably the alloy will have an improved mechanical behaviour (by including elements which harden both beta and alpha phases and by tunning the martensitic start temperature) and/or an improved manufacturability (by comparison of the transient solidification behaviour and the phase architecture during temperature cycling).

The present invention provides a titanium-based alloy composition consisting in weight percent, of: 3.0 to 7.0% aluminium, 3.0 to 10.0% vanadium, 3.0 to 10.0% molybdenum, 2.0 to 7.0% tin, 0.0 to 6.0% zirconium, 0.0 to 5.0% niobium, 0.0 to 0.5% iron, 0.0 to 4.0% chromium, 0.0 to 2.0 tungsten, 0.0 to 0.5% nickel, 0.0 to 0.5% tantalum, or between 0.0 to 2.5 tantalum when the sum of niobium and tantalum is 5.0% or less, 0.0 to 0.5% cobalt, 0.0 to 0.75% silicon, 0.0 to 0.5% boron, 0.0 to 0.5% carbon, 0.0 to 0.5% oxygen, 0.0 to 0.5% hydrogen, 0.0 to 0.5% nitrogen, 0.0 to 0.5% palladium, 0.0 to 0.5% lanthanum, 0.0 to 0.5% manganese or 0.0 to 2.5% manganese when the sum of chromium and manganese is 4.0 wt % or less, 0.0 to 1.0% hafnium, the balance being titanium and incidental impurities which satisfies the following relationship:

$$0.027V+0.178Fe+0.055(Mo+0.5W)+0.016Zr+0.044Cr+0.033(Nb+Ta)+0.053Sn>1.0$$

where Mo, W, V, Zr, Sn, Cr, Fe, Ta and Nb represent amounts of molybdenum, tungsten, vanadium, zirconium, tin, chromium, iron, tantalum and niobium in wt. % respectively. This composition provides a beta Ti-alloy which has improved manufacturability in terms of low hot cracking susceptibility and optimal solidification range. The alloy also has higher tendency to form desirable microstructures: equiaxed fine grains as opposed to highly columnar growth. Moreover, the alloy has good strength properties and the ability to retain metastable beta at room temperature.

In an embodiment of the invention, the titanium alloy consists of 9.0% or less molybdenum, preferably 8.5% or less molybdenum. This alloy has improved properties for additive manufacturability due to a lower solidification range and reduced martensitic start temperature while keeping the density within reasonable limits.

In an embodiment of the invention, the titanium alloy consists of 6.0% or more molybdenum, preferably 6.5% or more molybdenum. Molybdenum is beneficial because of its higher growth restriction factor (and resulting finer microstructure). This amount of molybdenum also reduces the martensitic start temperature of the composition while using small wt. % of alloyants while also adding beta strength and reducing the diffusivity.

In an embodiment of the invention, the titanium alloy consists of 9.5% or less vanadium. This alloy has improved properties for additive manufacturability due to a lower solidification range and reduced martensitic start temperature while keeping the cost within reasonable limits. These properties are further optimised by limiting vanadium content to 9.0% or even 8.0%

In an embodiment of the invention, the titanium alloy consists of 5.5% or more, preferably 6.0% or more vanadium, more preferably 6.5% or more vanadium. Vanadium is beneficial because of its higher growth restriction factor (and resulting finer microstructure). This amount of vanadium also reduces the martensitic start temperature of the composition while using small wt. % of alloyants while also adding beta strength and reducing the diffusivity.

In an embodiment of the invention, the titanium alloy consists of 3.5% or more tin, preferably 5.0% or more tin. This achieves a lower cracking susceptibility factor and a large growth restriction factor so excellent additive manufacturing properties.

In an embodiment of the invention, the titanium alloy consists of 6.5% or less tin, preferably 6.0% or less tin. Reducing the amount of tin keeps the aluminium equivalent value at the right level whilst greatly increasing the manufacturability and the strength.

In an embodiment of the invention, the titanium alloy consists of 1.0% or more niobium, preferably 1.5% or more niobium. This achieves a lower cracking susceptibility factor and a large growth restriction factor so excellent additive manufacturing properties. Niobium also increases the strength of the beta phase.

In an embodiment of the invention, the titanium alloy consists of 4.5% or less niobium, preferably 4.0% or less niobium, more preferably 3.0% or less niobium. Reducing the amount of niobium reduces the cost of the alloy, the diffusivity and the density whilst increasing strength and ease of manufacture of powder.

In an embodiment of the invention, the titanium alloy consists of 0.25% or less iron. This limits the solidification range of the alloy and avoids a high cracking susceptibility factor.

In an embodiment of the invention, the titanium alloy consists of 0.1% or more iron. Such an alloy has a high growth restriction factor whilst keeping the solidification range and the cracking susceptibility low. Moreover, small amounts of iron allows recyclability of other titanium alloys.

In an embodiment of the invention, the titanium alloy consists of 4.0% or less chromium, preferably 3.5% or less chromium, more preferably 3.0% or less chromium. This limits the solidification range of the alloy, avoids a high cracking susceptibility factor, reduces the diffusivity and keeps the cost low. Further advantages are achieved by limiting chromium to 2.0% or less.

In an embodiment of the invention, the titanium alloy consists of 0.5% or more chromium, preferably 1.0% or more, more preferably 1.5% or more or even 2.0% or more. Such an alloy has a high growth restriction factor whilst keeping the solidification range and the cracking susceptibility low. Moreover, chromium greatly increases the beta strength. Cr can be substituted by Mn by up to 2.5 wt. %.

In an embodiment of the invention, the titanium alloy consists of 4.5% or less, preferably 4.0% or less zirconium. This reduces the cost and the density of the alloy, and keeps the cracking susceptibility within limits.

In an embodiment of the invention, the titanium alloy consists of 1.0% or more zirconium, preferably 1.5% or more zirconium, more preferably 2.0% or more zirconium. This improves the strength and manufacturability (by solid solutioning and grain refinement) without affecting greatly the cost and density.

In an embodiment of the invention, the titanium alloy satisfies the flowing equation 300≥883−150Fe wt. %−96Cr wt. %−49Mo wt. %−37V wt. %−17Nb wt. %−12Ta wt. %−7Zr wt. %−3Sn wt. %+15Al wt. %.

in which Fe, Cr, Mo, V, Nb, Ta, Zr, Sn and Al represent the amounts of iron, chromium, molybdenum, vanadium, niobium, tantalum, zirconium, tin and aluminium in wt % respectively. Such an alloy is unlikely to compromise the manufacturing process due to the formation of brittle martensite phase during the thermal cycling which occurs during manufacturing.

In an embodiment of the invention, the titanium alloy satisfies the flowing equation 75≤883−150Fe wt. %−96Cr wt. %−49Mo wt. %−37V wt. %−17Nb wt. %−12Ta wt. %−7Zr wt. %−3Sn wt. %+15Al wt. %.≤300 in which Fe, Cr, Mo, V, Nb, Ta, Zr, Sn and Al represent the amounts of iron, chromium, molybdenum, vanadium, niobium, tantalum, zirconium, tin and aluminium in wt % respectively. Such an alloy is unlikely to compromise the manufacturing process because the martensite transformation occurs at low temperatures. Moreover, because such an alloy has martensitic phase at room temperature, it offers improved strength.

In an embodiment of the invention, the titanium alloy consists of 70.0 wt % or more titanium, preferably 72.5 wt % or more titanium. A powder of such an alloy is easier to produce with good chemical homogeneity and reduced segregation.

In an embodiment of the invention, the titanium alloy satisfies the following Al equivalent equation 7.0≤Al wt. %+⅓Sn wt. %+⅙Zr wt. %≤8.0

Where Al, Sn and Zr are the amounts in wt % of aluminium, tin and zirconium respectively. Such an alloy has increased strength.

Al may be present in an amount between 4.0 and 6.0% in order to promote hardened alpha phase. An optimal amount of 5.0% is assumed. Sn and Zr may be interchangeable and when the introduced relationship is fulfilled, the alloy is optimally strengthened while the formation of brittle alpha-stabilised phases is avoided. High Al also helps with alloy production. High melting elements such as Mo can be master alloyed with Al during the ingot production process.

In an embodiment of the invention, boron is added as a grain refiner. Experience shows that additives of up to 0.5%, but preferably at least 0.05% are beneficial.

In an embodiment of the invention, the titanium alloy consists of 0.1 wt % or more hafnium, preferably 0.5 wt % or more hafnium as this increases wear resistance by increasing the hardness.

In an embodiment of the invention the sum of wt. % of each of cobalt, nickel and manganese is 1.0 wt. % or less, preferably 0.5 wt % or less. Such an alloy has a low level of elements which would influence excessively the martensitic start temperature.

The term "consisting of" is used herein to indicate that 100% of the composition is being referred to and the presence of additional components is excluded so that percentages add up to 100%. Unless otherwise stated, all amounts are in weight percent.

The invention will be more fully described, by way of example only, with reference to the accompanying drawings in which:

FIG. 1 shows the effect of Zr and Sn on the contour maps of the merit indeces for the Ti-5Al-5V-5Mo-YZr—XSn-0Fe-0Cr-0Nb system.

FIG. 2 shows the effect of Mo and Cr on the contour maps of the merit indeces for the Ti-5Al-5V-YMo—XCr-0Fe-0Sn-0Zr-0Nb system.

FIG. 3 shows the effect of V and Fe on the contour maps of the merit indeces for the Ti-5Al-5Mo-YV—XFe-0Zr-0Sn-0Cr-0Nb system.

FIG. 4 shows the effect of Mo and Nb on the contour maps of the merit indeces for the Ti-5Al-5V-YMo—XNb-0Fe-0Cr-0Zr-0Sn system.

FIG. 5 shows the effect of Al and Sn on the contour maps of the merit indeces for the Ti-4Mo-4V-YAl—XSn-0Fe-0Cr-4Zr-0Sn system.

FIG. 6 illustrates the effect of alloy additions on merit indices.

FIG. 7 shows the merit index restrictions to isolate optimal alloy space.

FIG. 8 shows the contour map of the solidification range for the preferred alloy space.

FIG. 9 shows the contour map of the cracking susceptibility for the preferred alloy space.

FIG. 10 shows the contour map of the growth restriction factor for the preferred alloy space.

FIG. 11 shows the contour map of the melting temperature for the preferred alloy space.

FIG. 12 shows the contour map of the martensitic start temperature for the preferred alloy space.

FIG. 13 shows the contour map of the raw material cost for the preferred alloy space.

FIG. 14 shows the contour map of the normalised diffusivity for the preferred alloy space.

FIG. 15 shows the contour map of the density for the preferred alloy space.

FIG. 16 shows the contour map of the beta strength for the preferred alloy space.

FIG. 17 shows the optimal alloys inside the preferred alloy space.

FIG. 18 shows the merit properties of the baseline alloys.

FIG. 19 shows the merit properties of the proposed example alloys.

FIG. 20 shows the chemistry range of the optimal alloy space.

FIG. 21 shows how the restriction relationship works to separate the baseline alloys and the example alloys.

FIG. 22 shows a scatter plot of the crack susceptibility factor against the solidification range.

FIG. 23 shows a scatter plot of the crack susceptibility factor against the growth restriction factor.

FIG. 24 shows a scatter plot of the growth restriction factor against the solidification range.

FIG. 25 shows a scatter plot of the growth restriction factor against the martensite start temperature.

FIG. 26 shows a scatter plot of the growth restriction factor against the molybdenum equivalent value.

FIG. 27 shows a scatter plot of the growth restriction factor against the density.

FIG. 28 shows a scatter plot of the growth restriction factor against the raw material cost.

FIG. 29 shows a scatter plot of the growth restriction factor against the beta strength.

Traditionally, titanium-based alloys have been designed through empiricism. Thus their chemical compositions have been isolated using time consuming and expensive experimental development, involving small-scale processing of limited quantities of material and subsequent characterisation of their behaviour. The alloy composition adopted is then the one found to display the best, or most desirable, combination of properties. The large number of possible alloying elements indicates that these alloys are not entirely optimised and that improved alloys are likely to exist.

In titanium alloys, generally additions of aluminium (Al), zirconium (Zr), and tin (Sn) are added as α-stabilisers to improve the mechanical strength. However, excess content of Al wt. % equivalent leads to stability problems: loss of ductility and stress corrosion occurs due to reordering reaction of α2 formation after long-time exposure at high-temperature.

General additions of niobium (Nb), vanadium (V) and molybdenum (Mo) are added as a β-stabiliser to increase the mechanical strength without forming brittle intermetallic compounds. V makes a solid solution with the β phase. Mo also improves greatly the corrosion resistance of the alloy. High amounts of vanadium are restricted because those are known to lower the ductility of the alloy (V<10.0 wt. %).

Additions of nickel (Ni), cobalt (Co), iron (Fe) and chromium (Cr) may be added as β-stabiliser elements to reduce the beta-transus temperature, to metastabilise the beta phase, and to strengthen the beta phase. Cobalt and nickel may each be present in an amount of 0.5% or less, preferably 0.25% or less to avoid the formation of intermetallics which may have adverse effects on the ductility of the alloy. The requirements for iron and chromium are dealt with below.

Small additions of silicon (Si) and tin (Sn) are added to increase the strength and creep resistance. At high-temperatures, Si dissolves in the α phase and precipitates as silicides that pin mobile dislocations from climb and glide. Moreover, Si is believed to be a grain refiner thus an addition which may assist during the additive manufacturing process. Silicon was not part of the calculations described hereinafter, but experience shows that additions of up to 0.75%, but preferably at least 0.15% or 0.25% are beneficial for increased strength and to give mid temperature creep resistance and so may be included in the inventive alloy. However, with high amounts, Si may negatively influence the solidification path and induce hot cracking. Limiting silicon to 0.5% may offer advantages in terms of additive manufacturability, high Si content is likely to substantially change the last steps of the solidification process and could make the alloy susceptible to hot cracking.

Boron (B) is added as a grain refiner. Boron was not part of the calculations described hereinafter, but experience shows that additives of up to 0.5% (preferably 0.25% or less), but preferably at least 0.05% are beneficial and so are included in the inventive alloy. Boron has been proved to create equiaxed fine microstructures during the solidification process experienced in additive manufacturing—this is probably due to Boron creating new nucleation sites for multiple solidification fronts.

The present inventors have not modelled the effect of low levels of other commonly used alloying elements such as calcium, carbon, cobalt, silicon and manganese.

Manganese is a β-eutectoid stabiliser therefore further additions of Mn will promote formation of unwanted phases similarly to Cr, Ni and Fe. Mn may be present up to 0.5 wt. %. However, due to a very similar density and cost to Cr, one may substitute an amount of Cr (up to 2.5 wt. %) by Mn. That is the sum of Cr and Mn may be up to 4.0 wt. % with Mn being present up to 2.5 wt. %.

Calcium and carbon may be present at levels of up to 0.5% each and are not expected greatly to change the character of the alloy at this level.

A modelling-based approach used for the isolation of new grades of titanium-based bio-compatible alloys is described here, termed the "Alloys-By-Design" (ABD) method. This approach utilises a framework of computational materials models to estimate design relevant properties across a very broad compositional space. FIG. 2 illustrates the various steps of the method. In principle, this alloy design tool allows the so called inverse problem to be solved; identifying optimum alloy compositions that best satisfy a specified set of design constraints.

The first step in the design process is the definition of an elemental list along with the associated upper and lower compositional limits. The compositional limits for each of the elemental additions considered in this invention—referred to as the "alloy design space"—are detailed in Table 2.

TABLE 2

Alloys design space in wt. % searched using the 'Alloy-by-Design' method.

|      | Al   | V    | Mo   | Cr   | Fe  | Zr   | Sn   | Nb   |
|------|------|------|------|------|-----|------|------|------|
| Min. | 0.0  | 0.0  | 0.0  | 0.0  | 0.0 | 0.0  | 0.0  | 0.0  |
| Max. | 14.0 | 14.0 | 14.0 | 14.0 | 2.0 | 10.0 | 10.0 | 10.0 |

The second step relies upon thermodynamic calculations used to calculate the phase diagram and thermodynamic properties for a specific alloy composition. Often this is referred to as the CALPHAD method (CALculate PHAse Diagram). These calculations are conducted for those temperatures where an optimal phase architecture of the new alloy is found.

A third stage involves isolating alloy compositions which have the desired microstructural architecture for additive manufacturing and for bio-medical purposes. In the case of titanium alloys, the formability via additive manufacturing is related directly to the weldability of the alloy. In titanium alloys, the weldability can be correlated in a first instance to the microstructural architecture in terms of $\alpha$ and $\beta$ phase proportions. For near-$\alpha$ alloys, the weldability is good, these alloys are usually welded in annealed condition. For the $\alpha/\beta$ alloys, weldability is dependent on the amount of $\beta$ phase present. The most strongly beta stabilised alloys are usually embrittled during welding—high beta content alloys are rarely welded. The exception is Ti-6Al-4V which has good weldability and can have good mechanical properties after heat-treatment. Metastable $\beta$ alloys have good weldability and retain good mechanical properties after welding even without the need of post-heat treatment.

Thus, the model isolates all compositions in the design space which are the most amenable to additive manufacturing, which have a tendency to form stable $\beta$ microstructures for optimal additive manufacturability, and which have the right amount of ingredients to add strength and to have a stable microstructure. Moreover, the important factors such as melting temperature and amount of alloyants—which are important to obtain a uniform and chemically homogeneous powder particle—are also weighted into the design process.

In the fourth stage, merit indices are estimated for the remaining isolated alloy compositions in the dataset. Examples of these include: martensitic transformation merit index (which describes the temperature at which the transformation starts), manufacturability (which is related to the freezing range and the susceptibility of the alloy to crack which is a function of the transient solidification behaviour and the phase proportions of the alloy), and powder processability (which is related to the melting temperature and the amount of titanium in the alloy).

The first merit index relates to the susceptibility of the alloy to form the martensitic phase. This merit index uses the martensite start temperature model as disclosed in Suresh Neelakantana, *Prediction of the martensite start temperature for $\beta$ titanium alloys as a function of composition*, 60 Scripta Materialia 611 (2009). The martensitic start temperature (in ° C.) is calculated as a function of the alloy composition following $$M_S = 883 - 150 \text{Fe wt. \%} - 96 \text{Cr wt. \%} - 49 \text{Mo wt. \%} - 37 \text{V wt. \%} - 17 \text{Nb wt. \%} - 12 \text{Ta wt. \%} - 7 \text{Zr wt. \%} - 3 \text{Sn wt. \%} + 15 \text{Al wt. \%}$$

If the martensitic start temperature is below ambient temperature, martensitic phase will not be present at the microstructure level. Martensitic phase is hard and brittle and it could affect the crack susceptibility of the alloy if the thermal strains during the manufacturing process are high enough to crack this brittle phase. An upper limit of the martensitic start temperature can be defined so that the phase transformation does not compromise the manufacturing process (~<300° C.). Thus it is desirable that the following equation is satisfied $$300 \geq 883 - 150 \text{Fe wt. \%} - 96 \text{Cr wt. \%} - 49 \text{Mo wt. \%} - 37 \text{V wt. \%} - 17 \text{Nb wt. \%} - 12 \text{Ta wt. \%} - 7 \text{Zr wt. \%} - 3 \text{Sn wt. \%} + 15 \text{Al wt. \%}.$$

in which Fe, Cr, Mo, V, Nb, Ta, Zr, Sn and Al represent the amounts of iron, chromium, molybdenum, vanadium, niobium, tantalum, zirconium, tin and aluminium in wt % respectively.

In an embodiment of the invention, the titanium alloy satisfies the flowing equation $$75 \leq 883 - 150 \text{Fe wt. \%} - 96 \text{Cr wt. \%} - 49 \text{Mo wt. \%} - 37 \text{V wt. \%} - 17 \text{Nb wt. \%} - 12 \text{Ta wt. \%} - 7 \text{Zr wt. \%} - 3 \text{Sn wt. \%} + 15 \text{Al wt. \%} \leq 300$$

in which Fe, Cr, Mo, V, Nb, Ta, Zr, Sn and Al represent the amounts of iron, chromium, molybdenum, vanadium, niobium, tantalum, zirconium, tin and aluminium in wt % respectively. Such an alloy is unlikely to compromise the manufacturing process because the martensite transformation occurs at low temperatures. Moreover, because such an alloy has martensitic phase at room temperature, it offers improved strength.

FIG. 12 shows that the martensitic start temperature in the range of the invention can fall within the preferred range. The lower limit is plotted in FIG. 17 as Ms.

The second merit index is the freezing range. The freezing range is effectively the temperature range of the two phase liquid+$\beta$ phase region. This merit index is calculated using the Scheil thermodynamic calculation in ThermoCalc and provides the transient solidification route of the alloy. An expanded solidification range has the potential to increase hot tearing and excessive remelting of underneath layers during laser manufacturing. However, a narrow freezing range risks avoid partial remelting of the underneath layers during the AM process—this results in poor layer adhesion and low mechanical properties. Thus, it is desirable to monitor the temperature range at which the transition from liquid to solid occurs. Although not the most critical factor, it is desirable to maintain the freezing range within a reasonable value. Here, it is assumed that a freezing range between 100 and 275° C. is optimum. FIG. 8 shows this desirable requirement is met by the alloy when the requirement for GRF is met.

The third merit index is the crack susceptibility factor (CSF), it is calculated as a function of the time needed to solidify the last 10% of the liquid versus the time necessary to go from a 40% solid fraction to 90% solid fraction. The solidification is assumed to occur at a constant rate of decrease in temperature in order to facilitate the estimation of the solidification time. It is assumed that the risk of hot tearing is stronger during the last instants of the solidification, thus the goal is to minimise the time of that part of the solidification process. The CSF is calculated following $$CSF = \frac{\text{time}(f_{solid} = 0.9) - \text{time}(f_{solid} = 1.0)}{\text{time}(f_{solid} = 0.4) - \text{time}(f_{solid} = 0.9)}$$

where time($f_{solid}$) is the time required to reach a particular volume fraction of solid.

The fourth merit index is the growth restriction factor (GRF). The methodology to derive it is described in T. E. Quested, A. T. Dinsdale & A. L. Greer, *Thermodynamic Modeling of Growth-Restriction Effects in Aluminum Alloys*, 53 Acta Materialia 1323 (2005). Generally, it is accepted that an alloy with a large growth restriction factor tends to reject solute atoms during solidification which translate into finer grain size microstructures which are beneficial. The GRF is calculated as the derivative of the fraction of solid with respect to undercooling following $$GRF = \left(\frac{\partial(\Delta T_S)}{\partial f_s}\right)_{f_s \to 0}$$

where $f_s$ is the fraction of solid and $\Delta T_S$ is the solutal undercooling. This can be derived using the Scheil analysis. Further details can be found in the aforementioned scientific reference.

The fifth merit index is the powder processability. In order to facilitate the powder production process and obtain optimal elemental homogenisation, the melting temperature and the amount of alloyants must be minimised. Thus, for the fifth index, the temperature of the melting point is calculated, this is desirably below 1800° C. FIG. 11 shows that this can be achieved for the present alloy.

The fifth merit index also limits the amount of alloyants. Preferably pure titanium is at least 70 wt. % of the final composition in order to ease powder processing. If too little titanium is present it is believed that it may make processing of the powder (produced by atomisation of an ingot) difficult. That is, when the ingot of the correct composition is atomised, if too little titanium is present this may cause segregation whose occurrence is also related to the melting point. The atomised powder is then fed into a selective laser melting (SLM) machine for additive manufacture. Even more preferably the alloy is 72.5 wt. % or more titanium yet further to ease powder processing.

The sixth merit index is the diffusivity of the β-phase—which here we correlate to the liquidus diffusivity. This is linked to the processability by additive manufacturing. A slower diffusivity of β is translated into a finer microstructure that doesn't grow in a columnar manner during solidification. Here, the diffusivity is controlled by the faster diffusing species, consistent with $$D_{eff} = \sum_i x_i D_i$$

where $x_i$ is the concentration of element i and $D_i$ is its tracer diffusivity as shown in Table 3. The forming resistance merit index is related directly to this diffusivity, for clarity, the diffusivity merit index is written adimensionalised to the self-diffusivity of titanium—see Table 3.

TABLE 3 diffusivity (D) of beta stabilising elements at 870 C.
Diffusivity (D) of β-stabilising elements at 870° C.

| Element | D (cm²s) | D of element/ D of V |
|---|---|---|
| Ni | 220 × 10⁻¹⁰ | 63.7 |
| Co | 190 × 10⁻¹⁰ | 55.3 |
| Fe | 78 × 10⁻¹⁰ | 22.6 |

TABLE 3-continued diffusivity (D) of beta stabilising elements at 870 C.
Diffusivity (D) of β-stabilising elements at 870° C.

| Element | D (cm²s) | D of element/ D of V |
|---|---|---|
| Cr | 11 × 10⁻¹⁰ | 3.22 |
| β-Ti | 3.36 × 10⁻¹⁰ | 1.0 |
| V | 2.4 × 10⁻¹⁰ | 0.69 |
| Nb | 1.7 × 10⁻¹⁰ | 0.49 |
| Al | 1.44 × 10⁻¹⁰ | 0.43 |
| Mo | 0.6 × 10⁻¹⁰ | 0.173 |
| W | 0.2 × 10⁻¹⁰ | 0.063 |

FIGS. 14 and 19 show that the for present alloy a suitable diffusivity is achieved which is comparable to the diffusivity of the baseline alloys of FIG. 18.

The seventh merit index is density. The density, p, was calculated using a simple rule of mixtures and a correctional factor of 5% as has been shown practically to give a more accurate prediction, where, pi is the density for a given element and x is the atomic fraction of the alloy element.

$$\rho = 1.05\left[\sum_i x_i \rho_i\right]$$

Desirably the density of the alloy is kept within reasonable limits. FIG. 18 shows the density of baseline alloys falling between about 4.7 and 5.2 g/cm³. The density of the alloy is not the most important factor, but desirably the density is comparable to the baseline alloys, namely below 5.3 or 5.2 g/cm³. On the other hand, as shown by the examples of FIG. 19, the present alloy can have a density of less than 5.1 or even 5.0 g/cm³. The following equation gives a value for the density of the alloy:

$$1.05 \frac{\left(\begin{array}{l}\frac{4.43\text{Ti}}{4786}+\frac{2.7\text{Al}}{2698}+\frac{7.85\text{Fe}}{5584}+\frac{5.49\text{V}}{5094}+\\ \frac{10.18\text{Mo}}{9594}+\frac{6.49\text{Zr}}{9122}+\frac{7.85\text{Cr}}{5199}+\frac{8.6\text{Nb}}{9290}+\\ \frac{7.31\text{Sn}}{11871}+\frac{16.65\text{Ta}}{18094}+\frac{13.07\text{Hf}}{17849}+\frac{8.9\text{Ni}}{5869}+\\ \frac{7.3\text{Mn}}{5493}+\frac{8.86\text{Co}}{5893}+\frac{2.37\text{B}}{1081}+\frac{2.57\text{Si}}{2808}\end{array}\right)}{\left(\begin{array}{l}\frac{\text{Ti}}{4786}+\frac{\text{Al}}{2698}+\frac{\text{V}}{5094}+\frac{\text{Fe}}{5584}+\frac{\text{Mo}}{9594}+\frac{\text{Zr}}{9122}+\\ \frac{\text{Cr}}{5199}+\frac{\text{Nb}}{9290}+\frac{\text{Sn}}{11871}+\frac{\text{Ta}}{18094}+\\ \frac{\text{Hf}}{17849}+\frac{\text{Ni}}{5869}+\frac{\text{Mn}}{5493}+\frac{\text{Co}}{5893}+\frac{\text{B}}{1081}+\frac{\text{Si}}{2808}\end{array}\right)}$$

The eighth merit index is cost. In order to estimate the cost of each alloy a simple rule of mixtures was applied, where the weight fraction of the alloy element, $x_i$, was multiplied by the current (2018) raw material cost for the alloying element, $c_i$.

$$\text{Cost} = \sum_i x_i c_i$$

The estimates assume that processing costs are identical for all alloys, i.e. that the product yield is not affected by composition. FIGS. 13 and 19 show that for alloys of the present invention the improved properties come a the expense of increased cost, but the material cost remains acceptable.

The ninth merit index is the β-phase strength. This is described by Sadeghpor et. al. *A new multi-element beta titanium alloy with a high yield strength exhibiting transformation and twinning induced plasticity effects* Scripta Materialia (2018). A relationship that qualitatively measures the beta phase strength is expressed as $$\Delta\sigma = 1.5n(\text{Fe wt. \%} + \text{Mn wt. \%}) + 1.3n(\text{Cr wt. \%}) + n(\text{Al wt. \%} + \text{Mo wt. \%}) + 0.7n(\text{V wt. \%}) + 0.5n(\text{Sn wt. \%}) + 0.4n(\text{Zr wt. \%}) + 0.3n(\text{Nb wt. \%})$$

where n is a material parameter (assumed n=50). Ideally, one wants to maximise the strength merit index. Preferably delta sigma is 1110 or higher, and this is higher than achieved for many of the baseline alloys of FIG. 18 meaning that the β-phase present will be stronger than in those alloys. FIG. 16 shows that this level of beta strength can be achieved by the present alloy.

The ABD method described above was used to isolate the inventive alloy composition. The design intent for this alloy was to isolate the composition of a new beta titanium alloy which exhibits a combination of stiffness, strength, manufacturability, processability, density, cost and stability which is comparable or better than equivalent grades of alloys. Desirably the microstructure is between 50-100% beta phase as measured by optical microscopy.

The material properties—determined using the ABD method—for the literature baseline titanium alloys are listed in FIG. 18. The design of the new alloy was considered in relation to the predicted properties listed for these baseline alloys. The method was used to propose optimised alloy compositions with different levels of predicted strength and manufacturability parameters. The calculated material properties for 8 optimised alloys with nominal compositions according to FIG. 19 and in accordance with the present invention are also given.

FIG. 6 shows the effect of each alloy on various properties, FIG. 7 shows the desired properties of the alloy and FIGS. 8 to 16 show variations of the merit indices in the preferred alloy space. Linear regression analysis was used to determine relationships which allow an alloy to achieve a certain merit index and these are plotted on FIG. 17. FIG. 18 shows the properties determined for the baseline alloys and FIG. 19 as shows the same for 8 example alloys of the invention. FIG. 21 compares the baseline and example alloys with the results of the linear regression analysis. Those 8 example alloys (dark dots) and the baseline alloys (light dots) are then plotted in FIGS. 22-29 from which the improvement in properties can clearly be seen.

An important characteristic in order to improve the additive manufacturing properties of titanium alloys is a low crack susceptibility factor (CSF), namely the fourth merit index. FIGS. 1-5 illustrate the effects of varying amounts of molybdenum, vanadium, niobium, tin, chromium, iron and zirconium on the crack susceptibility factor. The effect of vanadium, tin, niobium and molybdenum is positive, but the effect of niobium and tin is the strongest.

As can be seen, a minimum crack susceptibility factor is generally achieved for an amount of tin of around 4-6% (more being limited by the aluminium equivalent quantity, the solidification range and the density) and for high amounts of niobium (this limited by the density and the solidification range). Conversely, as can be seen from the contour maps of FIGS. 1-5, increased amounts of tin and niobium can deleteriously lead to a greater solidification (freezing) range. This, along with density (FIGS. 1-5), means that the best balance of properties is achieved when the alloy contains 5.0 wt. % or less niobium and 7.0% or less tin. However, a minimum amount 2.0 wt. % tin is necessary in order to achieve a sufficiently low CSF value and to add strength to the alpha phase. Even more tin, for example 3.5% or more, preferably 4.0% or more or even 4.5 or 5.0% or more yet further reduces CSF and adds to strength. The following equation derived by regression analysis from results of the third merit index valid within the elemental range of the alloy (Al 3.0-7.0, V 0.0-10.0, Mo 3.0-10.0, Sn 2.0-7.0, Zr 0.0-6.0, Nb 0.0-5.0. Fe 0.0-0.5, Cr 0.0-4.0) gives an elemental relationship between alloyants and a threshold where a low cracking susceptibility is more likely within the preferred optimal space:

$$0.041\text{Al} - 0.03\text{V} + 4\text{Fe} - 0.015\text{Mo} + 0.037\text{Zr} + 0.24\text{Cr} - 0.02\text{Nb} - 0.112\text{Sn} < 0$$

where Mo, V, Zr, Sn, Cr, Fe and Nb represent amounts of molybdenum, vanadium, zirconium, tin, chromium, iron and niobium in wt. % respectively. This line is plotted in FIG. 17 and labelled CSF.

Another important merit index is the growth restriction factor (GRF). Sn, Mo, V, Nb, Zr, Cr and Fe increase the GRF. The effect of Sn, Cr and Fe is the strongest. However, Cr and Fe greatly increase the range of solidification and increase the cracking susceptibility. Thus the amount of Cr is restricted to amounts of 4.0% or less, preferably 3.5% or less, more preferably 3.0% or less and Fe is restricted to values of 0.5 wt. % or less. The amount of Sn is restricted to 7.0% (as mentioned above) and this keeps the aluminium equivalent to levels where α2 phases are not formed. Mo, V, Nb and Zr do not increase CSF and their quantities are determined by the right martensitic start temperature in order to metastabilise the beta phase. The following equation derived by regression analysis from the results of the fourth merit index gives an elemental relationship valid within the elemental range of the alloy (Al 3.0-7.0, V 0.0-10.0, Mo 3.0-10.0, Sn 2.0-7.0, Zr 0.0-6.0, Nb 0.0-5.0. Fe 0.0-0.5, Cr 0.0-4.0) between alloyants and a high growth restriction:

$$0.027\text{V} + 0.178\text{Fe} + 0.055(\text{Mo} + 0.5\text{W}) + 0.016\text{Zr} + 0.044\text{Cr} + 0.033(\text{Nb} + \text{Ta}) + 0.053\text{Sn} > 1.0$$

where Mo, W, V, Zr, Sn, Cr, Fe, Ta and Nb represent amounts of molybdenum, tungsten, vanadium, zirconium, tin, chromium, iron, tantalum, and niobium in wt. % respectively. This line is plotted in FIG. 17 and labelled GRF. This restricts the minimum amount of each element in order to achieve a high enough GRF (i.e. a GRF of at least 45 which is higher than the GRF achieved by any of the baseline alloys—see FIG. 19).

Molybdenum has a strong effect on reducing the martensitic start temperature and thus β-stabilising the alloy (FIG. 2) while keeping the content of pure titanium high. Molybdenum is also important in increasing the growth restriction factor (FIG. 2) and to some extent reducing the cracking susceptibility factor (FIG. 2). However, molybdenum has the effect of increasing the overall solidification range (FIG. 2). Nonetheless, molybdenum is a known grain refiner and a strong β stabiliser, thus it allows an alloy with a high titanium content to be produced (thereby increasing the ease of powder processing and its chemical homogeneity). Along with niobium and vanadium, molybdenum undesirably increases the melting temperature (FIG. 2). Therefore it has been found that in order to keep the amount of titanium high and to avoid a high density, a suitable level of molybdenum is 10.0 wt. % or less. Because of its beneficial effect on GRF, in lowering the martensitic temperature, and its positive effect on strength, molybdenum is present in an amount of at least 3.0 wt. % or more. Desirably molybdenum is present in amount of 9.0 wt. % or less, preferably 8.5 wt. % or less to reduce its effect on the increase on solidification range, to assure that the martensite start temperature range remains within the desired range and lo keep the density low. On the other hand, an amount of molybdenum of 6.0 wt % or more, preferably 6.5 wt. % or more is advantageous as this ensures the GRF remaining high, and the martensitic temperature remains low without needing further to increase the amount of other less effective beta stabilisers.

W can play a similar role to Mo in titanium alloys: (i) it as a beta isomorphous stabiliser, (ii) strengthens the beta phase, and (iii) it increases the growth restriction factor—and refines the grain size. W is usually less popular than Mo because: (i) it is more dense—almost double than Mo, (ii) it is difficult to pre-alloy—difficult to source in master alloy form, and (iii) it risks the formation of brittle particulates. Nevertheless, W has an even lower diffusivity than Mo and it could be used instead of Mo—despite the associated difficulties. W is limited to 2.0% or less for these reasons. Because of the added density, in the present patent, Mo may be substituted in an embodiment by Mo following Mo=2W.

Vanadium also has a strong effect on reducing the martensitic start temperature and thus β-stabilising the alloy (FIG. 3) while keeping the content of pure titanium high. Vanadium is also important in increasing the growth restriction factor (FIG. 3) without increasing the cracking susceptibility factor (FIG. 3). Vanadium also decreases the effective diffusivity which helps with grain refinement during manufacturing. However, vanadium has the effect of increasing the overall solidification range (FIG. 3) and the cost (FIG. 3). Nonetheless, vanadium is a known grain refiner and a strong β stabiliser, thus it allows an alloy with a high titanium content to be produced (thereby increasing the ease of powder processing and its chemical homogeneity). Along with niobium and molybdenum, vanadium undesirably increases the melting temperature (FIG. 3). Therefore, it has been found that a suitable level of vanadium is 10.0 wt. % or less in order to keep the cost and density low. Moreover, amounts of V higher than 10.0 wt. % are known to have a negative effect on the ductility of the alloy. Because of its beneficial effect on GRF, diffusivity, beta strength and beta stabilisation, vanadium is present in an amount of at least 3.0 wt. % or more, desirably 5.5 wt. % or more, more desirably 6.0 or even 6.5 wt. % or more. Desirably vanadium is present in amount of 9.5 wt. % or even 9.0 wt. % or less to reduce its effect on the increase on solidification range, to assure that the martensite start temperature range remains within the desired range, to keep ductility high, and to keep the raw material cost low. Keeping vanadium at 8.0 et. % or less is even more desirable.

Tin (Sn) and zirconium (Zr) are introduced to add strength. Moreover, Sn offers good additive manufacturability since it reduces the likelihood of cracking and refines the microstructure. Sn is one of the strongest elements in improving the growth restriction and reducing the crack susceptibility. From the GRF point of view, one wants to maximise the amount of Sn in the alloy. In terms of CSF, an optimal value of is found at Sn=4.0 wt. %. After that, the cracking susceptibility increases again—up to 7.0 wt. % Sn, the values of cracking susceptibility is within acceptable limits. Both Zr and Sn can act as α-stabilisers, the amount of Sn is limited to Sn 7.0 wt. %, preferably 6.5% or less, more preferably 6.0% or less in order to avoid instable alpha phases and to promote a lower CSF. In an embodiment at least 5.0% or more Sn is added to increase the manufacturability (by decreasing cracking susceptibility and increasing growth restriction) and to increase strength. Zr does not have a substantial negative effect in manufacturability (CSF and GRF) or other microstructural phenomena such as martensite forming temperature. Zr can be added to the alloy to increase strength.

The following equation relating to aluminium equivalents, when satisfied results in an increase in strength:

$$7.0 \leq \text{Al wt. \%} + \tfrac{1}{3}\text{Sn wt. \%} + \tfrac{1}{6}\text{Zr wt. \%} \leq 8.0$$

A maximum amount of 6.0% zirconium ensures that the amount of secondary alloyants does not interfere with the strengthening benefits of Al and Sn (if Al and Sn are present in 5.0 and 6.0 wt. % respectively—those are preferred over Zr). However an amount of zirconium of up to 6.0% or less can be tolerated for any allowable amount of Al and Sn and such an alloy has reasonable strength and manufacturability as well cost, density and good crack susceptibility factor. Zr also increases the CSF slightly, is not one of the most optimal promoters of GRF and is one of the less strengthening elements in the beta phase. Therefore, given the amount of Al and Sn present in the alloy, Zr is desirable in an amount of 5.0 or less, preferably 4.5% or less, more preferably 4.0% or less, even more preferably 3.0% or less. Zr adds some strength without heavily stabilising the beta phase, therefore, it is desirable in an amount of 1.0% or more, preferably 1.5% or more, more preferably 2.0% or more.

Aluminium (Al) acts as a strong alpha strengthener, lowers the density of the alloy, reduces the cost and reduces the effective diffusivity. Al has a negligible effect on the GRF and a small effect on the CSF—therefore it is assumed benign to the manufacturability. However, Al increases the martensitic temperature and reduces the beta stability. Therefore, in order to reduce density, cost and diffusivity and to increase strength, Al is present in amounts of 3.0 wt % or more, desirably in amounts 4.0% or more, preferably 4.5% or more, more preferably 5.0% or more. In order to avoid strong alpha-stabilisation and to reduce the chances of forming brittle alpha phases Al is present in an amount of 7.0% or less, desirably Al is 6.0% or less, preferably 5.5% or less, more preferably 5.0% or less.

Niobium (Nb) lowers the cracking susceptibility and increases the growth restriction as the amount of Nb increases—this is good for manufacturability. Increase of Nb also decreases diffusivity and martensitic start temperature—good for manufacturability and beta-stability. However, Nb increases cost and density substantially. For the above reasons, Nb may be present in an amount of 5.0 wt. % or less, desirably in an amount of 4.5% or less, preferably 4.0% or less, more preferably 3.0% or less—this ensures cost and density within limits. Nb is desirable in an amount of 1.0 or more, preferably 1.5% or more, more preferable 2.5% or more.

Iron (Fe) and Chromium (Cr) are excellent strengtheners and increase greatly the growth restriction—this is good for mechanical properties and manufacturability respectively. However, Fe greatly increases the cracking susceptibility and the solidification range. For this reason, Fe is limited to amounts below 0.5%, more preferably below 0.25%. Chromium also increases cracking susceptibility therefore Cr is limited to amounts 4.0% or less, preferably 3.5% or less or even 3.0% or less. Even small amounts of Cr increase strength and GRF, therefore Cr is present in a desirable amount of 0.5% or more, preferably 1.0% or more, more preferably 1.5% or more, even more preferably 2.0% or more. Small amounts of Fe allow one to recycle other titanium alloys and increases strength and GRF, therefore, Fe is desirable in amounts larger than 0.1%, more preferably 0.2%.

In an embodiment of the invention the sum of wt. % of each of cobalt, nickel and manganese is 1.0 wt. % or less, preferably 0.5 wt % or less. Such an alloy has a low level of elements which would influence excessively the martensitic start temperature.

Tantalum and Hafnium have a very high elemental cost and are not believed to increase the strength performance of beta titanium alloys substantially. Thus, tantalum is limited to 0.5 wt % or less and hafnium to 1.0 wt % or less. Ta can play a similar role to Nb in titanium alloys. Both are beta isomorphous and both have similar strengthening properties and diffusivities. Moreover, both will give similar oxidation resistance without having a detrimental effect in the rest of the calculated properties. Therefore, Nb may be substituted by Ta in a 1-to-1 fashion. So long as the sum of niobium and tantalum is 5.0 wt % or less.

O may be added as a solid solution strengthener to titanium alloys. Even very small amounts of 0 can greatly increase the strength of the alloy. However, excessive O will have a detrimental effect in ductility—thus limiting O to 0.5% or less. If one desires good creep properties, O should be limited to a minimum—it is a fast diffuser and will have a detrimental effect on creep. H and N have similar effects to O and therefore are limited in an analogous manner to up to 0.5%.

La has been shown to be a great grain stabiliser for manufacturability (breaks planar growth). Therefore one may want to include limited amounts to further improve manufacturability. However, it is expensive and difficult to source as a master alloy therefore an optional additions in an amount of up to 0.5%.

Pd has been shown to offer excellent corrosion resistance when included in titanium alloys—even in very small quantities (<0.5%). However, Pd is very expensive and therefore it is treated as an optional element.

FIG. 17 shows the various restrictions which can be applied to the claimed area to achieve one or more desired optional properties in addition to high GRF. The solid area shows the most desired area which has high GRF, as well as the optional but none the less desirable: low density, low CSF and a martensite start temperature between 75 and 300 degrees C. For low levels of Zr and Cr (top row) the GRF and density requirements limit the allowable elements as well as the need for a martensite start temperature below 300 degrees C. at higher Nb concentrations. For higher levels of Zr (second and third rows), the desired CSF limits the elemental range for the most desired properties. For low levels of zirconium with higher levels of Cr (bottom row), the martensite start temperature being desirably higher than 75 degree C. (labelled as Ms) as well as the CSF and density place limits on the elemental composition to achieve the most desirable combination of properties. However, by meeting the requirement for a high GRF value, the properties of the alloy within the elemental range of the present invention will be superior to those of the baseline alloys and the other properties are within acceptable limits, as shown by FIGS. 8-16.

FIGS. 22-29 illustrate the range of merit indices of alloys in the range in which the model was run (Table 2) with the properties of the existing baseline alloys numbered and plotted on the same graphs as well as areas of the inventive range plotted (as restricted in FIG. 7). As can be seen, the alloys of the present invention have improved properties over the otherwise most suitable existing alloys.

The invention claimed is:

1. A titanium-based alloy composition consisting in weight percent, of: 3.0 to 7.0% aluminium, 5.5 to 10.0% vanadium, 3.0 to 10.0% molybdenum, 3.5 to 7.0% tin, 0.0 to 6.0% zirconium, 0.0 to 5.0% niobium, 0 to 0.5% iron, 0.0 to 4.0% chromium, 0.0 to 2.0 tungsten, 0.0 to 0.5% nickel, 0.0 to 0.5% tantalum, 0.0 to 0.5% cobalt, 0.0 to 0.75% silicon, 0.0 to 0.5% boron, 0.0 to 0.5% carbon, 0.0 to 0.5% oxygen, 0.0 to 0.5% hydrogen, 0.0 to 0.5% nitrogen, 0.0 to 0.5% palladium, 0.0 to 0.5% lanthanum, 0.0 to 0.5% manganese, 0.0 to 1.0% hafnium, the balance being titanium and incidental impurities which satisfies the following relationship:

$$0.027V + 0.178Fe + 0.055(Mo + 0.5W) + 0.016Zr + 0.044Cr + 0.033(Nb + Ta) + 0.053Sn > 1.0$$

wherein Mo, W, V, Zr, Sn, Cr, Fe, Ta and Nb represent amounts of molybdenum, tungsten, vanadium, zirconium, tin, chromium, iron, tantalum and niobium in wt. % respectively;

wherein the amount of tantalum ranges from 0.0 to 2.5 wt. % when the sum of the wt. % of niobium and tantalum is 5.0% or less; and wherein the amount of manganese ranges from 0.0 to 2.5 wt. % manganese when the sum of the wt. % of chromium and manganese is 4.0 wt. % or less.

2. The titanium-based alloy composition of claim 1, consisting of 3.0 wt. % to 9.0 wt % molybdenum.

3. The titanium-based alloy composition of claim 1, consisting of 6.0% to 10 wt. % molybdenum.

4. The titanium-based alloy composition of claim 1, which satisfies the following equation $$7.0 \leq Al\ wt.\ \% + \tfrac{1}{3}Sn\ wt.\ \% + \tfrac{1}{6}Zr\ wt.\ \% \leq 8.0$$

wherein Al, Sn and Zr represent the amounts of aluminium, tin and zirconium in wt % respectively.

5. The titanium-based alloy composition of claim 1, consisting of 5.0 wt. % to 7.0 wt. % tin.

6. The titanium-based alloy composition of claim 1, consisting of 5.0 wt. % or less zirconium.

7. The titanium-based alloy composition of claim 1, consisting of 1.0 wt. % to 5.0 wt. % zirconium.

8. The titanium-based alloy composition of claim 1, consisting of 5.5 wt. % to 9.5 wt. % vanadium.

9. The titanium-based alloy composition of claim 1, which satisfies the flowing equation $$300 \geq 883 - 150Fe\ wt.\ \% - 96Cr\ wt.\ \% - 49Mo\ wt.\ \% - 37V\ wt.\ \% - 17Nb\ wt.\ \% - 12Ta\ wt.\ \% - 7Zr\ wt.\ \% - 3Sn\ wt.\ \% + 15Al\ wt.\ \%$$

wherein Fe, Cr, Mo, V, Nb, Ta, Zr, Sn and Al represent the amounts of iron, chromium, molybdenum, vanadium, niobium, tantalum, zirconium, tin and aluminium in wt. % respectively.

10. The titanium-based alloy composition of claim 1, which satisfies the following equation $$75 \leq 883 - 150Fe\ wt.\ \% - 96Cr\ wt.\ \% - 49Mo\ wt.\ \% - 37V\ wt.\ \% - 17Nb\ wt.\ \% - 12Ta\ wt.\ \% - 7Zr\ wt.\ \% - 3Sn\ wt.\ \% + 15Al\ wt.\ \%$$

in which Fe, Cr, Mo, V, Nb, Ta, Zr, Sn and Al represent the amounts of iron, chromium, molybdenum, vanadium, niobium, tantalum, zirconium, tin and aluminium in wt. % respectively.

11. The titanium-based alloy composition of claim 1, consisting of 0.5 wt. % to 4.0 wt. % chromium.

12. The titanium-based alloy composition of claim 1, consisting of 0.00 wt. % to 0.25 wt. % boron.

13. The titanium-based alloy composition of claim 1, consisting of 0.05 wt. % to 0.5 wt. % boron.

14. The titanium-based alloy composition of claim 1, consisting of 0.15 wt. % to 0.75 wt. % silicon silicon.

15. The titanium-based alloy composition of claim 1, consisting of 4.0 wt. % to 7.0 wt. % aluminium.

16. The titanium-based alloy composition of claim 1, wherein the sum of wt. % of each of cobalt, nickel and manganese is 0.0 wt. % to 2.0 wt. %.

17. The titanium-based alloy composition of claim 1, which satisfies the following equation;

$$0.041Al-0.03V+4Fe-0.015Mo+0.037Zr+0.24Cr-0.02Nb-0.112Sn<0.0$$

wherein Fe, Cr, Mo, V, Nb, Ta, Zr, Sn and Al represent the amounts of iron, chromium, molybdenum, vanadium, niobium, tantalum, zirconium, tin and aluminium in wt. % respectively.

18. The titanium-based alloy composition of claim 1, which satisfies the following equation $$50Al+35V+75Fe+65Cr+20Zr+50Mo+15Nb+25Sn>1110$$

which wherein Fe, Cr, Mo, V, Nb, Ta, Zr, Sn and Al represent the amounts of iron, chromium, molybdenum, vanadium, niobium, tantalum, zirconium, tin and aluminium in wt. % respectively.

19. The titanium based alloy of claim 1, wherein the alloy has a microstructure of between 50% and 100% beta phase as measured by optical microscopy.

20. The titanium-based alloy composition of claim 1, which satisfies the flowing equation $$1.05 \frac{\left(\begin{array}{c} \frac{4.43Ti}{4786} + \frac{2.7Al}{2698} + \frac{7.85Fe}{5584} + \frac{5.49V}{5094} + \\ \frac{10.18Mo}{9594} + \frac{6.49Zr}{9122} + \frac{7.85Cr}{5199} + \frac{8.6Nb}{9290} + \\ \frac{7.31Sn}{11871} + \frac{16.65Ta}{18094} + \frac{13.07Hf}{17849} + \frac{8.9Ni}{5869} + \\ \frac{7.3Mn}{5493} + \frac{8.86Co}{5893} + \frac{2.37B}{1081} + \frac{2.57Si}{2808} \end{array}\right)}{\left(\begin{array}{c} \frac{Ti}{4786} + \frac{Al}{2698} + \frac{V}{5094} + \frac{Fe}{5584} + \frac{Mo}{9594} + \frac{Zr}{9122} + \\ \frac{Cr}{5199} + \frac{Nb}{9290} + \frac{Sn}{11871} + \frac{Ta}{18094} + \\ \frac{Hf}{17849} + \frac{Ni}{5869} + \frac{Mn}{5493} + \frac{Co}{5893} + \frac{B}{1081} + \frac{Si}{2808} \end{array}\right)} < 5.3,$$

wherein Ti, Al, V, Fe, Cr, Zr, Mo, Nb, Sn, Ta, Hf, Ni, Mn, Co, B and Si represent the amounts of titanium, aluminium, vanadium, iron, chromium, zirconium, molybdenum, niobium, tin, tantalum, hafnium, nickel, manganese, cobalt, boron and silicon in wt. % respectively.

* * * * *